(12) United States Patent
Hoshino et al.

(10) Patent No.: US 10,137,409 B2
(45) Date of Patent: Nov. 27, 2018

(54) SYSTEM, DEVICE AND METHOD FOR GENERATING ION CONCENTRATION GRADIENT, AND TEMPERATURE-RESPONSIVE ELECTROLYTE MATERIAL

(75) Inventors: Yu Hoshino, Fukuoka (JP); Yoshiko Miura, Fukuoka (JP); Kazushi Imamura, Fukuoka (JP); Ryohei Ohashi, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 986 days.

(21) Appl. No.: 14/239,283

(22) PCT Filed: Aug. 17, 2012

(86) PCT No.: PCT/JP2012/070900
§ 371 (c)(1),
(2), (4) Date: May 22, 2014

(87) PCT Pub. No.: WO2013/027668
PCT Pub. Date: Feb. 28, 2013

(65) Prior Publication Data
US 2014/0294707 A1    Oct. 2, 2014

Related U.S. Application Data

(60) Provisional application No. 61/646,543, filed on May 14, 2012, provisional application No. 61/525,421, filed on Aug. 19, 2011.

(51) Int. Cl.
*B01D 53/14* (2006.01)
*B01D 53/62* (2006.01)
*H01B 1/12* (2006.01)

(52) U.S. Cl.
CPC ......... *B01D 53/62* (2013.01); *B01D 53/1425* (2013.01); *B01D 53/1475* (2013.01);
(Continued)

(58) Field of Classification Search
CPC ........... B01D 53/1425; B01D 53/1475; B01D 53/1456; B01D 53/1493; B01D 53/62; H01B 1/122; Y02C 10/04; Y02C 10/06
See application file for complete search history.

(56) References Cited

U.S. PATENT DOCUMENTS

| 6,423,282 B1 | 7/2002 | Araki et al. |
| 2008/0127632 A1* | 6/2008 | Finkenrath ............ B01D 53/22 60/274 |

(Continued)

FOREIGN PATENT DOCUMENTS

| EP | 2 228 118 A1 | 9/2010 |
| JP | 60-168706 A | 9/1985 |

(Continued)

OTHER PUBLICATIONS dictionary.com pdf definition for material. accessed Dec. 11, 2016.*
(Continued)

*Primary Examiner* — Cabrena Holecek
(74) *Attorney, Agent, or Firm* — Sughrue Mion, PLLC

(57) ABSTRACT

A system for producing an ion concentration gradient and a temperature-responsive electrolyte material which are utilizable, for example, for efficiently converting heat energy that has been discarded into reusable energy or for efficiently recovering an acid gas, such as carbon dioxide is provided. A temperature-responsive electrolyte is used to produce an ion concentration gradient by means of a temperature gradient. The temperature-responsive electrolyte is used in the state of an aqueous solution and also in the state of a solid phase.

20 Claims, 28 Drawing Sheets

PRODUCTION OF ION CONCENTRATION GRADIENT

(52) U.S. Cl.
CPC ......... *B01D 53/1493* (2013.01); *H01B 1/122* (2013.01); *Y02C 10/04* (2013.01); *Y02C 10/06* (2013.01)

(56) References Cited

U.S. PATENT DOCUMENTS

| | | |
|---|---|---|
| 2009/0218537 A1 | 9/2009 | Soroushian et al. |
| 2012/0220035 A1 | 8/2012 | Lu et al. |
| 2014/0106440 A1* | 4/2014 | Penders ............ B01D 53/1475 435/266 |

FOREIGN PATENT DOCUMENTS

| | | | |
|---|---|---|---|
| JP | 60-233182 A | | 11/1985 |
| JP | 3-151015 A | | 6/1991 |
| JP | 05-255119 A | | 10/1993 |
| JP | 09-154573 A | | 6/1997 |
| JP | 10-506132 A | | 6/1998 |
| JP | 2000-319304 A | | 11/2000 |
| JP | 2001-232104 A | | 8/2001 |
| JP | 2003-49088 A | | 2/2003 |
| JP | 2004-292298 A | | 10/2004 |
| JP | 2004-331760 A | | 11/2004 |
| JP | 2005-290116 A | | 10/2005 |
| JP | 2007-173221 A | | 7/2007 |
| JP | 2010-155753 A | | 7/2010 |
| JP | 2010155753 A | * | 7/2010 |
| JP | 201112107 A | | 1/2011 |
| WO | 96/06134 A1 | | 2/1996 |
| WO | 99/00078 A1 | | 1/1999 |
| WO | 99/51326 A1 | | 10/1999 |
| WO | 2007/016271 A2 | | 2/2007 |
| WO | 2007/016271 A3 | | 2/2007 |
| WO | 2009/031523 A1 | | 3/2009 |

OTHER PUBLICATIONS

Machine English translation of JP 2010155753 accessed from Espacenet on Mar. 19, 2017.*
Search Report dated Jul. 8, 2015 issued by the European Patent Office in counterpart European Patent Application No. 12826155.9.
J Brijitta et al; "Phase Behavior of Poly(N-isopropylacrylamide) Nanogel Dispersions: Temperature Dependent Particle Size and Interactions"; Journal of Nanoscience and Nanotechnology; XP055197999; vol. 9; No. 9; Sep. 2009; 12 pgs. total.
Shuiqin Zhou et al; "In-Situ Interferometry Studies of the Drying and Swelling Kinetic of an Ultrathin Poly(N-isopropylacrylamide) Gel Film below and above its Volume Phase Transition Temperature"; Macromolecules; XP055198110; vol. 29; No. 14; 1996; pp. 4998-5001.
Notification of Refusal dated May 31, 2016, by the Japanese Patent Office in counterpart Japanese Application No. 2013-529997.
Search Report, Issued by the European Patent Office, Dated Mar. 20, 2015, In counterpart European Patent Application No. 12826155.9.
International Search Report (PCT/ISA/210), dated Nov. 20, 2012, issued by the International Searching Authority in counterpart International Patent Application No. PCT/JP2012/070900.
International Preliminary Report on Patentability (PCT/IPEA/409) issued by the International Searching Authority in corresponding Application No. PCT/JP2012/070900.
Communication dated Aug. 7, 2018 issued by the Japanese Patent Office in counterpart Japanese Application No. 2017-165950.

* cited by examiner

SYSTEM, DEVICE AND METHOD FOR GENERATING ION CONCENTRATION GRADIENT, AND TEMPERATURE-RESPONSIVE ELECTROLYTE MATERIAL

TECHNICAL FIELD

The present invention relates to a system, device, and method for producing an ion concentration gradient which are capable of converting a temperature gradient into chemical energy, electrical energy, and the like, and also to a temperature-responsive electrolyte material.

BACKGROUND ART

A molecule having both a polar group and a hydrophobic group therein, such as surfactants, poly(N-substituted acrylamide) derivatives, such as poly(N-isopropylacrylamide), poly(N-substituted methacrylamide) derivatives, copolymers of these, poly(vinyl methyl ether), partly acetylated poly(vinyl alcohol), and polypeptides (proteins and peptides), are known to have a temperature responsiveness in which the molecule satisfactorily dissolves or disperses in water at low temperatures but, upon heating to or a certain temperature or higher, the molecule gathers, shrinks, aggregates, gelates, or precipitates due to hydrophobic interaction. Such materials have been utilized as incubation materials, biomaterials such as DDS materials, adsorbents, supports for substance separation, and gelling agents. For example, MATRIGEL (trademark), which is a gelatinous protein mixture and into which a protein such as collagen has been incorporated, PLURONIC (registered trademark), which is a nonionic surfactant, and UPCELL (registered trademark), which is poly(N-isopropylacrylamide), are on the market as matrices for cell incubation, DDS materials, and culture medium bases.

Meanwhile, in many factories including electric power plants and ironworks and in apparatus having an internal combustion engine, such as motor vehicles, ships, and airplanes, a large proportion of the heat energy (about 60% of the energy in the case of thermal power generation and engines) is discarded. In recent years, more efficient energy utilization is required from the standpoint of rendering sustainable society, and there is a desire for a technique for converting waste heat into utilizable energy. A method for recovering heat energy from waste heat and reusing the recovered energy as warm water or the like (cogeneration, combined-cycle power generation, heating in motor vehicles, or the like) and a technique for converting a temperature difference into electrical energy using a thermoelectric conversion element have already been developed. However, no technique for efficiently recovering energy from a small temperature difference has been devised, and most of the waste heat (28% in cogeneration) is being discarded into the environment even at present without being utilized.

There also is a desire for a technique for separating and recovering carbon dioxide from discharge gases, from the standpoint of preventing the global warming. Since carbon dioxide is readily absorbed into basic aqueous solutions, a chemical absorption method using an aqueous solution of a low-molecular weight amine is presently receiving attention. However, the aqueous solution of a low-molecular weight amine needs to be heated to an extremely high temperature when the carbon dioxide absorbed thereinto is separated therefrom, and the current chemical absorption method has an exceedingly poor energy efficiency.

Incidentally, Patent Document 1 describes a technique which has an electromotive-force layer constituted of both a polar polymer and a polar low-molecular weight compound contained in the matrix of the polymer and in which charges are generated by means of a temperature difference.

PRIOR-ART DOCUMENT

Patent Document

Patent Document 1: JP-A-2007-173221

SUMMARY OF THE INVENTION

Problems to be Solved by the Invention

The present invention is to provide a system, device, and method for producing an ion concentration gradient and a temperature-responsive electrolyte material which are utilizable, for example, for efficiently converting heat energy that has been discarded into reusable energy or for efficiently recovering an acid gas, such as carbon dioxide.

Means for Solving the Problems

The present inventors diligently made investigations and, as a result, have found that a temperature gradient can be converted to a gradient of ion, such as proton, concentration (potential difference) by utilizing a phenomenon in which the pKa of a temperature-responsive polymer electrolyte that, in response to temperature, undergoes phase transitions changes with temperature. The invention has been thus completed.

Namely, the present invention is as follows.

(1) A system for producing an ion concentration gradient by means of a temperature gradient by using a temperature-responsive electrolyte.

(2) The system according to (1) above wherein the temperature-responsive electrolyte is a polymer.

(3) The system according to (1) or (2) above wherein the temperature-responsive electrolyte is used in the state of an aqueous solution.

(4) The system according to (3) above which comprises vessels containing an aqueous solution of the temperature-responsive electrolyte.

(5) The system according to (4) above
which comprises a plurality of vessels containing an aqueous solution of the temperature-responsive electrolyte, wherein
a part of the plurality of vessels is adjusted to a phase transition temperature of the temperature-responsive electrolyte or lower, and
the other part of the plurality of vessels is adjusted to a phase transition temperature of the temperature-responsive electrolyte or higher.

(6) The system according to (5) above wherein the vessel which is adjusted to the phase transition temperature of the temperature-responsive electrolyte or lower and the vessel which is adjusted to the phase transition temperature of the temperature-responsive electrolyte or higher are connected to each other so that the temperature-responsive electrolyte and ions can move therebetween.

(7) The system according to (4) above wherein a portion of one of the vessels is adjusted to the phase transition temperature of the temperature-responsive electrolyte or lower and another portion of the vessel is adjusted to the phase transition temperature of the temperature-responsive electrolyte or higher.
(8) The system according to any one of (4) to (7) above wherein the inside of the vessels is partitioned into a plurality of sections with a semipermeable membrane which is permeable to ions but impermeable to the temperature-responsive electrolyte.
(9) The system according to (8) above wherein the temperature-responsive electrolyte is contained in only a part of the plurality of sections.
(10) The system according to (1) or (2) above wherein the temperature-responsive electrolyte is used in the state of a solid phase.
(11) The system according to (10) above wherein the state of the solid phase is a hydrogel state.
(12) The system according to (10) or (11) above
which comprises a plurality of vessels containing an aqueous salt solution, wherein
the plurality of vessels are connected to each other by means of a solid phase of the temperature-responsive electrolyte,
a part of the plurality of vessels is adjusted to a phase transition temperature of the temperature-responsive electrolyte or lower, and
the other part of the plurality of vessels is adjusted to a phase transition temperature of the temperature-responsive electrolyte or higher.
(13) The system according to any one of (5) to (9) and (12) above wherein a heat source which is used for the adjustment to a temperature higher than the phase transition temperature of the temperature-responsive electrolyte is waste heat.
(14) The system according to any one of (1) to (13) above wherein the temperature-responsive electrolyte is an amine-containing N-isopropylacrylamide.
(15) The system according to (14) above wherein the temperature-responsive electrolyte is fine particles of the amine-containing N-isopropylacrylamide.
(16) The system according to any one of (1) to (14) above wherein the temperature-responsive electrolyte is a carboxylic-acid-containing N-isopropylacrylamide.
(17) The system according to (16) above wherein the temperature-responsive electrolyte is fine particles of the carboxylic-acid-containing N-isopropylacrylamide.
(18) The system according to any one of (1) to (17) above in which is used as a battery by producing a potential difference.
(19) The system according to any one of (1) to (17) above which is for use in recovering an acid gas.
(20) The system according to (19) above wherein the acid gas is carbon dioxide.
(21) The system according to (19) or (20) above wherein the temperature-responsive electrolyte has a basic group.
(22) The system according to (21) above wherein the basic group is an amino group.
(23) The system according to (22) above wherein the amino group is a tertiary amino group.
(24) The system according to (21) above wherein the basic group is an imidazole group.
(25) The system according to any one of (19) to (24) above wherein the recovery of the acid gas comprises causing the acid gas to be absorbed into a basic aqueous solution or into an aqueous solution of the temperature-responsive electrolyte and causing the aqueous solution to release the acid gas absorbed thereinto.
(26) The system according to (25) above wherein the acid gas is absorbed into the aqueous solution by adjusting the aqueous solution to the phase transition temperature of the temperature-responsive electrolyte or lower.
(27) The system according to (25) or (26) above wherein the acid gas absorbed into the aqueous solution is released by adjusting the aqueous solution to the phase transition temperature of the temperature-responsive electrolyte or higher.
(29) The system according to any one of (1) to (17) above which is for use in separating ions.
(30) The system according to (29) above which is for use in separating at least any of protons, hydroxide ions, sodium ions, potassium ions, chloride ions, and iodide ions.
(31) A device for producing an ion concentration gradient by means of a temperature gradient by using a temperature-responsive electrolyte.
(32) A method for producing an ion concentration gradient by means of a temperature gradient by using a temperature-responsive electrolyte.
(33) A temperature-responsive electrolyte material which has an ionizable functional group and which undergoes a volume phase transition in response to temperature.
(34) A temperature-responsive electrolyte material for absorbing carbon dioxide, which is an aqueous solution of fine hydrogel particles having basic functional groups and undergoing a volume phase transition in response to temperature.
(35) A temperature-responsive electrolyte material for absorbing carbon dioxide, which is a thin film of a hydrogel having basic functional groups and undergoing a volume phase transition in response to temperature.

Effects of the Invention

According to the invention, an ion concentration gradient can be efficiently produced by using a temperature-responsive electrolyte and applying a temperature gradient thereto. Furthermore, the invention can be rendered usable for electric power generation and as batteries, etc., by utilizing the produced ion concentration gradient as a potential difference, and can be used, for example, for the recovery of an acid gas, such as carbon dioxide, in which adsorption and release can be repeated. The invention is applicable to other uses such as, for example, ion separation, improvements in the efficiency of fuel cells, and other energy conversion.

EMBODIMENTS FOR CARRYING OUT THE INVENTION

Figure 1:
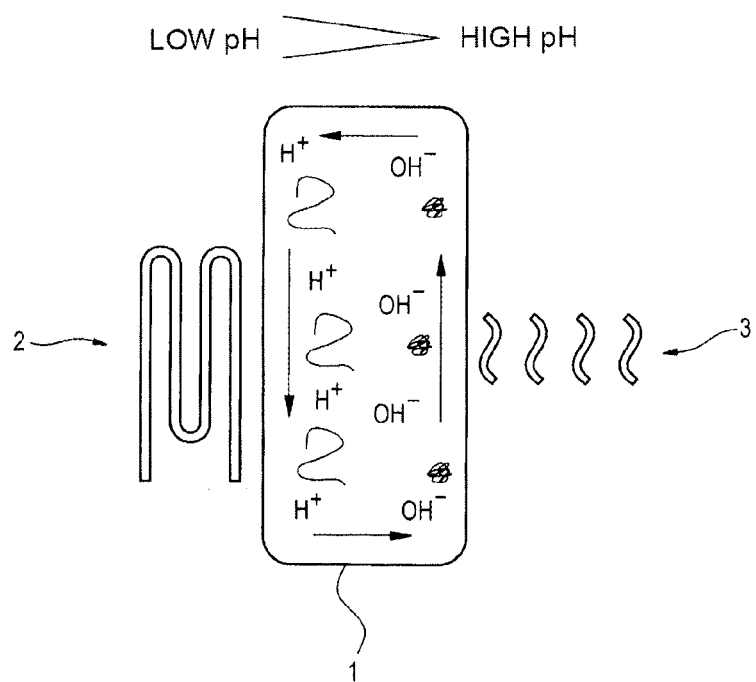
FIG. 1 is a diagrammatic view which illustrates one example of the ion concentration gradient generator of the invention.

The system, device, and method for producing an ion concentration gradient of the invention are explained below in detail.

The present invention is characterized by using a temperature-responsive electrolyte to produce an ion concentration gradient by means of a temperature gradient.

The temperature-responsive electrolyte to be used in the invention is not particularly limited so long as the electrolyte changes in ionization as temperature changes. It is, however, preferred that the temperature-responsive electrolyte should be, for example, a polymer.

More specifically, examples of the temperature-responsive electrolyte include an electrolyte which has both a polar group and a hydrophobic group in the molecule and which has a functional group capable of releasing an ion in aqueous solutions (i.e., ionizable functional group).

Examples of a molecule which has both a polar group and a hydrophobic group therein include surfactants, poly(N-isopropylacrylamide), and polypeptides (proteins and peptides).

The ionizable functional group may be either an acidic group which releases $H^+$ or a basic group which is capable of becoming a positive charge, and can be suitably selected in accordance with purposes of applications of the invention.

Examples of the acidic group include a sulfuric acid group, carboxylic acid group, phosphoric acid group, and phenolic hydroxyl group.

Examples of the basic group include an amino group, imidazole group, and pyridyl group.

Such a temperature-responsive electrolyte may be produced by combining an ionizable functional group, by covalent bonding, with a molecule having both a polar group and a hydrophobic group therein. Alternatively, such a temperature-responsive electrolyte may be produced by copolymerizing a monomer ingredient having an ionizable group, a monomer ingredient having a polar group, and a monomer ingredient having a hydrophobic group or by copolymerizing a monomer ingredient having an ionizable group and a monomer ingredient having a polar group and a hydrophobic group.

A molecule having both a polar group and a hydrophobic group therein, such as surfactants, poly(N-isopropylacrylamide), and polypeptides (proteins and peptides), has a temperature responsiveness in which the molecule satisfactorily dissolves or disperses in water at low temperatures but, upon heating to a certain temperature higher, the molecule gathers, shrinks, aggregates, gelates, or precipitates due to hydrophobic interaction.

On the other hand, the degree of electrolytic dissociation (pKa) of an electrolyte reversibly changes in accordance with the environment (polarity) in which the electrolyte is present and with the distance between the electrolyte molecules. For example, sulfuric acid in an aqueous solution, which is highly polar, mostly ionizes to have the structures of sulfuric acid anions (anions such as $HSO_4^-$ and $SO_4^{2-}$), which are highly polar. However, in cases when an organic solvent is added thereto to lower the polarity of the medium, the degree of electrolytic dissociation decreases and a large proportion of those anions comes to have the structure of sulfuric acid ($H_2SO_4$), which is lowly polar. Meanwhile, in cases when any of many carboxylic acids is closely disposed on one molecule, polymer, or material, then electrostatic repulsion is exerted between carboxylate anions located close to each other to render the ions (anions such as $RCOO^-$) unstable in terms of energy state, resulting in a decrease in the degree of electrolytic dissociation and an increase in the proportion of sulfuric acid (RCOOH) having no charge.

In the present invention, a (high-molecular weight) molecule which combines those two properties and which has a molecule having both a polar group and a hydrophobic group therein, such as a surfactant, a polypeptide, or poly (N-isopropylacrylamide), and further has an ionizable functional group (electrolyte), i.e., a temperature-responsive electrolyte, is utilized to produce an ion concentration gradient from a temperature difference, and the ion concentration gradient is converted to chemical or electrical energy or otherwise utilized.

Figure 24:
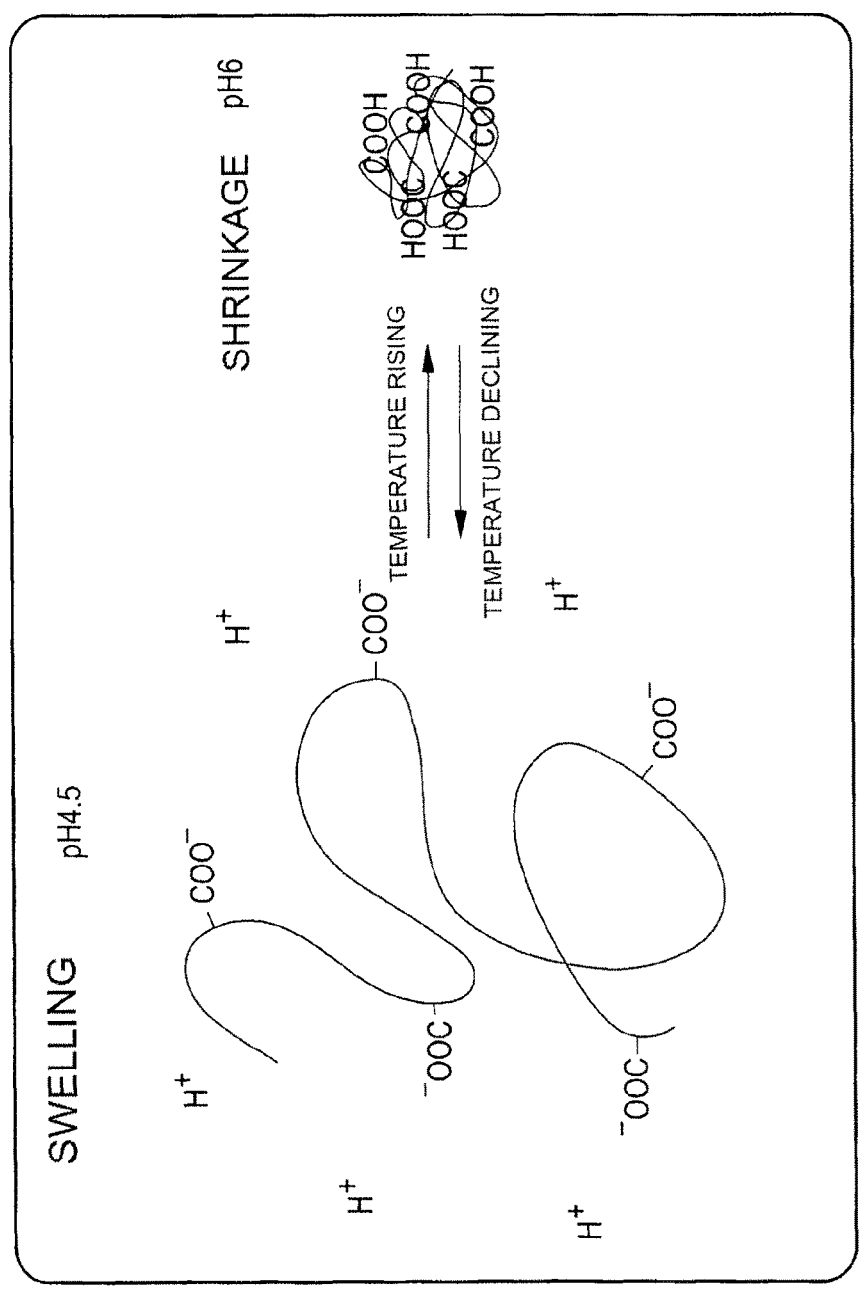
FIG. 24 is a diagrammatic view which illustrates a temperature change-dependent behavior of one example of the temperature-responsive electrolytes usable in the invention.

Such a temperature-responsive electrolyte behaves in the following manner. In a high-temperature region, the molecules gather, shrink, aggregate, gelate, or precipitate to thereby render the environment surrounding the ions hydrophobic (lowly polar) or render the electrolyte less ionizable due to the reduced distance between the ions. In a low-temperature range, however, the molecules disperse, swell, or dissolve to thereby heighten the polarity of the surrounding environment or prolong the distance between the ions, thereby rendering the electrolyte easily ionizable. Namely, temperature-responsive electrolytes having an acid (functional group capable of becoming a negative charge), such as sulfuric acid or a carboxylic acid, show a low pKa value at low temperatures but have an increased value of pKa in a high-temperature range (FIG. 24). On the other hand, temperature-responsive electrolytes having a base (functional group capable of becoming a positive charge), such as an amine, have a high pKa at low temperatures but have a reduced value of pKa in a high-temperature range.

Figure 9:
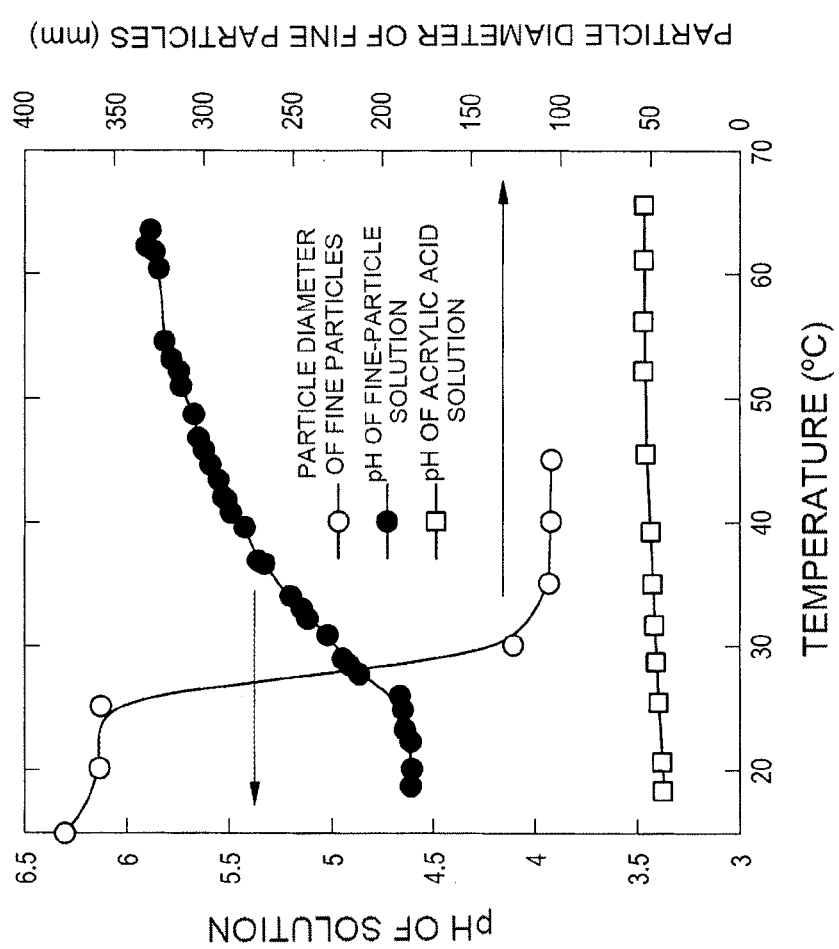
FIG. 9 is graphs which show temperature-dependent solution pH changes and the phase transition temperature of one example of temperature-responsive nanoparticulate electrolytes usable in the invention.
Figure 14:
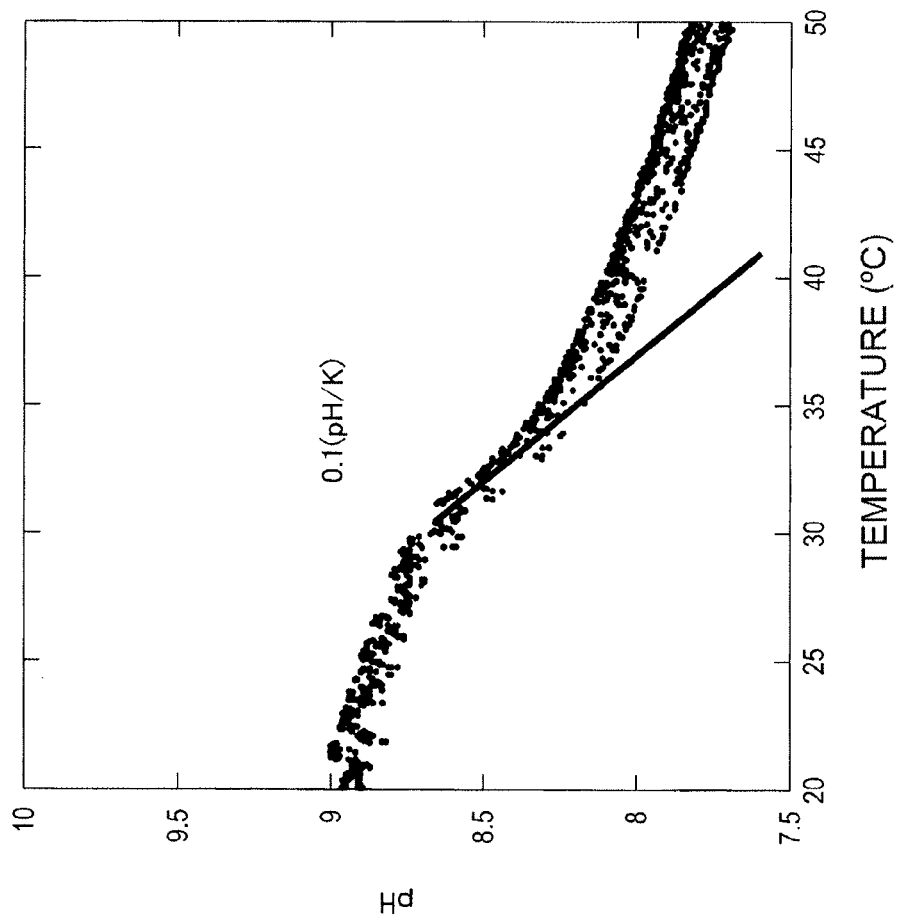
FIG. 14 is a graph which shows temperature-dependent pH changes of a solution of one example of basic-group-containing temperature-responsive electrolytes usable in the invention.
Figure 16:
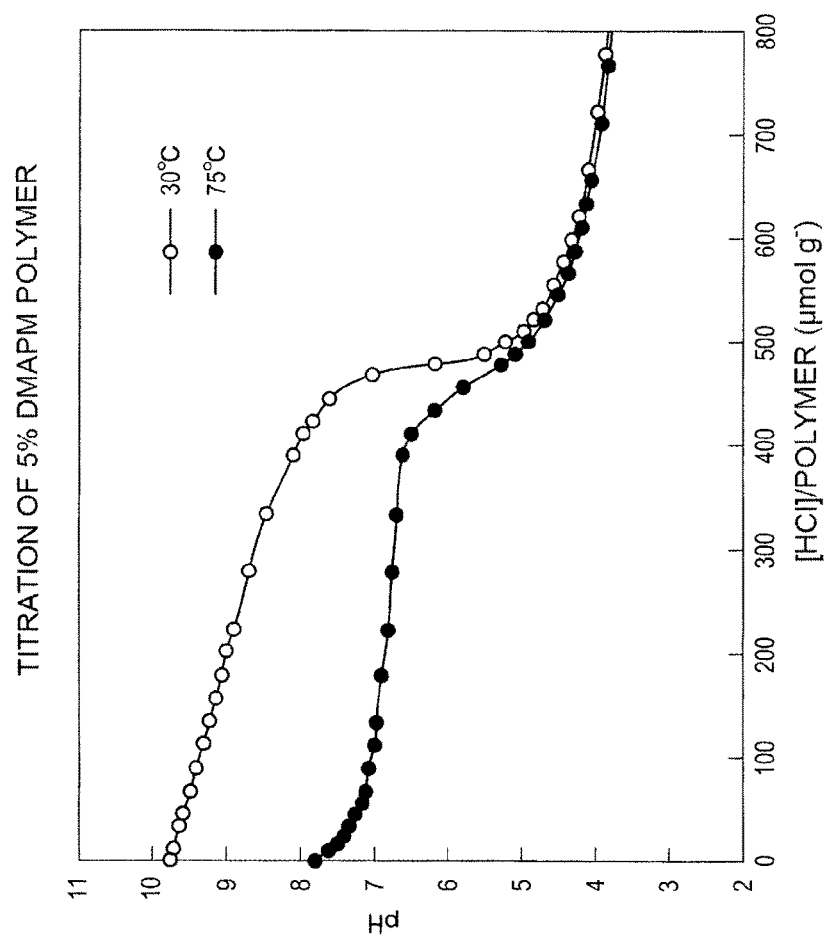
FIG. 16 is graphs which show the results of temperature-dependent pH titration of a solution of one example of amine group-containing temperature-responsive electrolytes usable in the invention.
Figure 17:
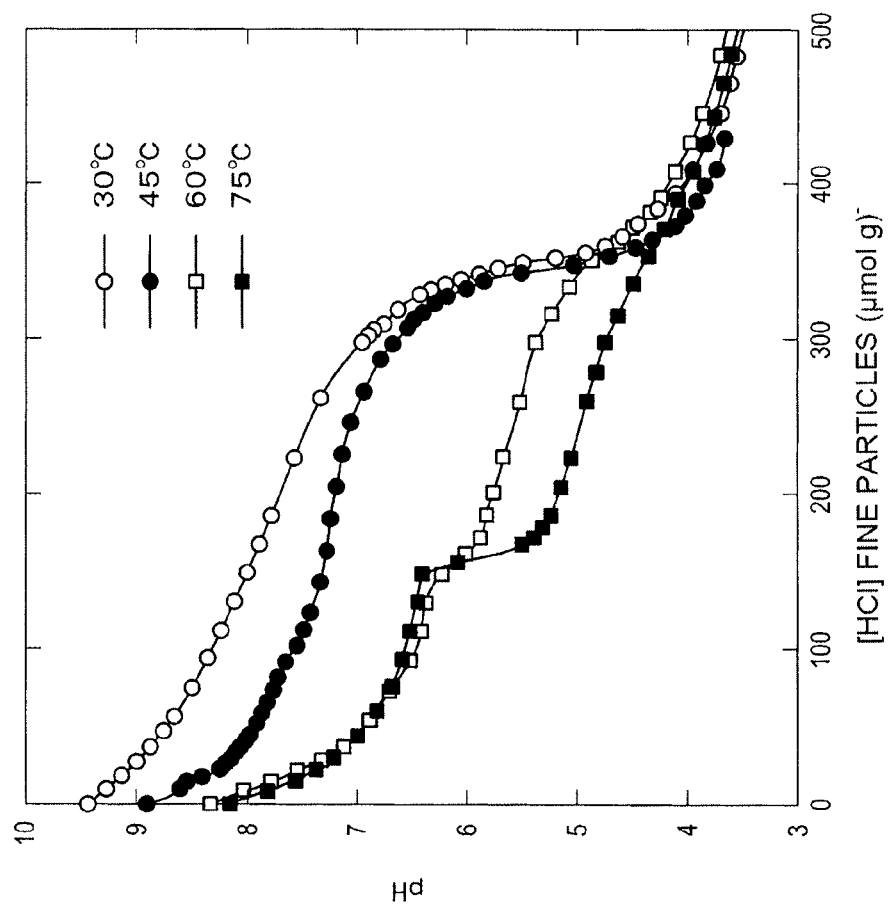
FIG. 17 is graphs which show the results of temperature-dependent pH titration of a solution of one example of amine group-containing temperature-responsive finely particulate electrolytes usable in the invention.

A temperature-responsive nanoparticulate electrolyte was actually synthesized by copolymerizing acrylic acid, which has a carboxylic acid, and N-isopropylacrylamide, and the pH thereof was measured while changing the temperature. As a result, in cases when the temperature was elevated, the pH abruptly came to increase at a certain temperature (FIG. 9). The pH gradient observed in this measurement reached $0.1\ K^{-1}$ at the most. According to Nernst's equation, that value of gradient corresponds to tens of $mVK^{-1}$. An examination of the nanoparticles for the temperature dependence of particle diameter by the dynamic light scattering method revealed that the nanoparticles come to undergo a phase transition and shrink abruptly, at the temperature at which the pH comes to increase. Namely, it was indicated that this temperature-responsive electrolyte (nanoparticles of a poly (N-isopropylacrylamide) copolymer having a carboxylic acid) is in a swollen state at low temperatures so that a large proportion of the carboxylic acid has been ionized, but the electrolyte shrinks as the temperature rises, resulting in a decrease in the degree of ionization of the carboxylic acid. This phenomenon is observed not only with acidic temperature-responsive electrolytes such as a carboxylic acid but also with basic temperature-responsive electrolytes such as an amine group or an imidazole group (FIGS. 14, 16, and 17).

A temperature-responsive nanoparticulate electrolyte was synthesized by copolymerizing a basic monomer having an imidazole group (1-H-imidazole-4-N-acryloylethanamine) or an amine group (N-[3-dimethylamino]propyl)methacrylamide) (DMAPM), in place of acrylic acid, with N-isopropylacrylamide, and examined for temperature-responsive pH change. As a result, this electrolyte showed relatively high values of pH at temperatures lower than the phase transition point, but as the temperature was elevated, the pH abruptly came to decline at around the phase transition point (FIG. 14). The pH gradient observed in this examination also was about $0.1\ K^{-1}$ at the most, which corresponds to tens of $mVK^{-1}$ according to Nernst's equation. A temperature-responsive electrolyte obtained by copolymerizing N-[3-dimethylamino]propyl]methacrylamide, which has an amine group in place of imidazole, also has reduced values of pka in a high-temperature range (FIG. 16). Furthermore, the temperature-responsive nanoparticulate electrolyte obtained by copolymerizing N-[3-dimethylamino]propyl]methacrylamide was subjected to pH titration with hydrochloric acid at various temperatures and, as a result, the apparent point of neutralization shifted considerably before and after the phase transition point (FIG. 17). Namely, part of the dimethylamino groups function as a base at temperatures not higher than the phase transition temperature but, at elevated temperatures not below the phase transition temperature, the dimethylamino groups are buried in shrunk polymer chains and do not function as a base.

Although it has generally been known that the pH of an electrolyte changes as the temperature is changed, the pH changes of common electrolytes have been about $0.01\ K^{-1}$ per ° C. It can be seen that a remarkable pH change which has not been observed with any existing electrolyte can be achieved by using a temperature-responsive electrolyte.

Figure 10:
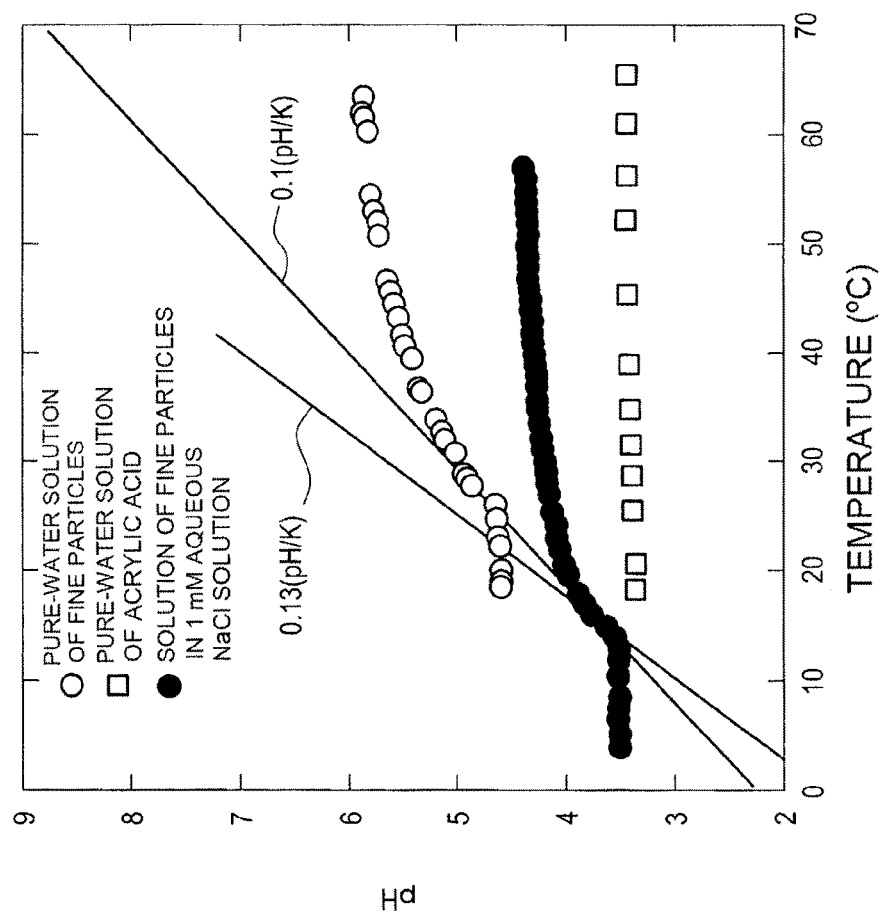
FIG. 10 is graphs which show temperature-dependent pH changes of a solution of one example of the temperature-responsive nanoparticulate electrolytes usable in the invention.

Many of the temperature-responsive electrolytes have a phase transition point and undergo an abrupt change in gathering, shrinkage, agglomeration, gelation, or sedimentation state at around the phase transition temperature. Because of this, aqueous solutions and the like which contain the temperature-responsive electrolytes can be made to undergo an abrupt pH change by a slight temperature change. The phase transition temperature of such a temperature-responsive electrolyte can be controlled by means of not only the polarity or ionic strength of the solution containing the temperature-responsive electrolyte or the concentration of the temperature-responsive electrolyte but also the hydrophilic/hydrophobic balance or electrolyte density of the temperature-responsive electrolyte (FIG. 10).

Figure 22:
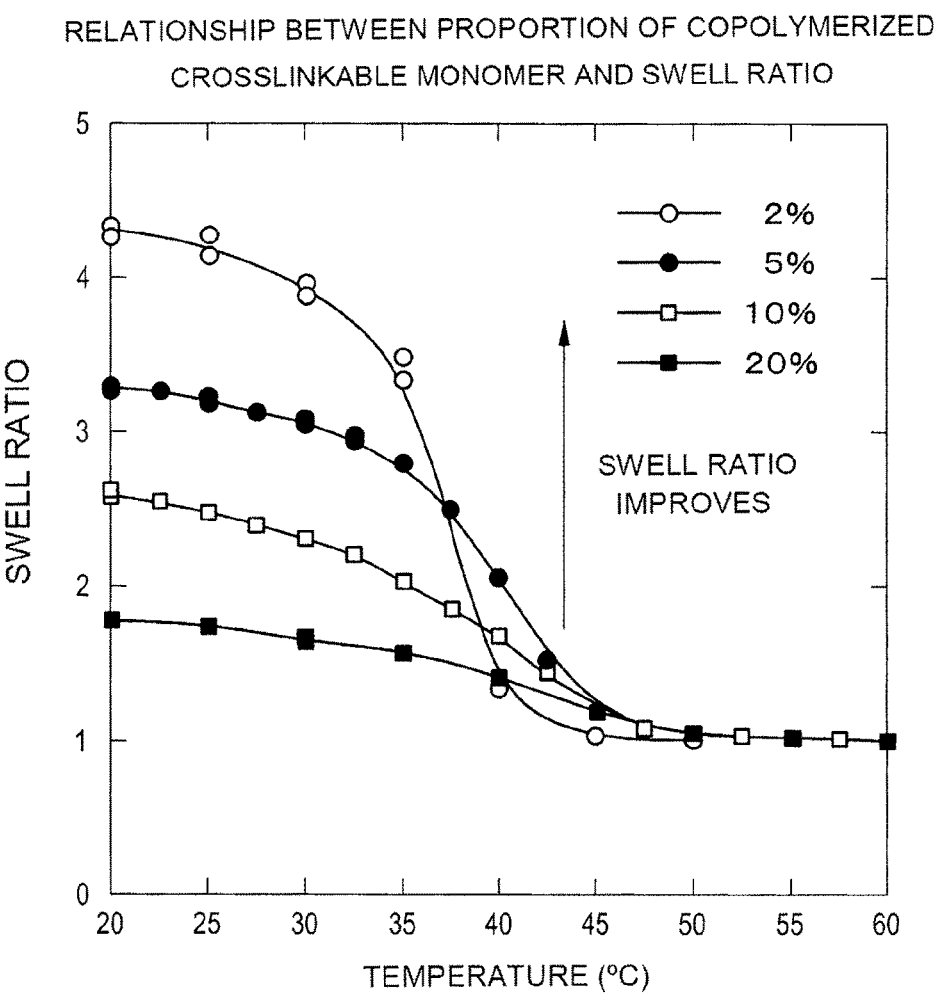
FIG. 22 is graphs which show relationships between the proportion of a copolymerized crosslinkable monomer and swell ratio in one example of temperature-responsive electrolytes usable in the invention.

Furthermore, the pH range or temperature range over which an electrolyte is desired to change can be controlled by controlling the kind of the electrolyte (strong acid, weak acid, weak base, strong base, etc.), the density thereof, or the degree of gathering, shrinkage, aggregation, gelation, or precipitation. Namely, temperature-responsive electrolytes can be controlled so as to have the desired temperature responsiveness in a range of an extremely low pH to a high pH in accordance with the design of the molecules and the design of the media. For example, as shown in FIG. 22, changes in swell ratio with changing temperature can be regulated by regulating the amount of a crosslinkable monomer such as N,N'-methylenebisacrylamide (proportion of a crosslinkable monomer to be copolymerized) when a temperature-responsive electrolyte polymer (nanoparticles) is synthesized.

Figure 23:
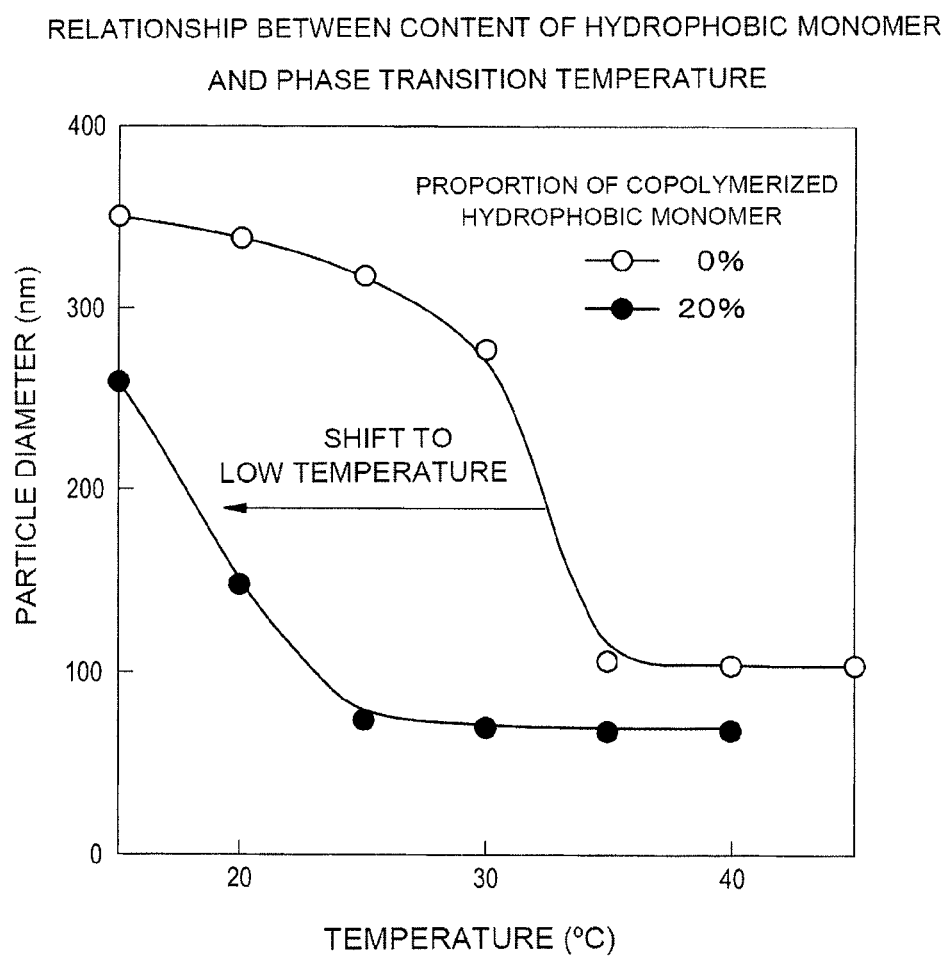
FIG. 23 is graphs which show relationships between the proportion of a copolymerized hydrophobic monomer and phase transition temperature in one example of the temperature-responsive electrolytes usable in the invention.

Furthermore, as shown in FIG. 23, phase transition temperature can be adjusted by adjusting the content of a hydrophobic monomer such as N-t-butylacrylamide (proportion of a hydrophobic monomer to be copolymerized) when a temperature-responsive electrolyte polymer (nanoparticles) is synthesized.

In the invention, the temperature-responsive electrolyte may be dissolved in water or the like and used in the form of an aqueous solution or the like, or may be used in the form of a solid phase (solid).

In the case where a temperature-responsive electrolyte is used in the form of an aqueous solution, the temperature-responsive electrolyte may be in the state of having been completely dissolved in the aqueous medium or may be present in the state of fine particles in the aqueous medium. In cases when the temperature-responsive electrolyte is present in the state of fine particles in an aqueous medium and when these nanoparticles are evenly present in the aqueous medium without the need of use of a dispersant or the like or stirring, then this temperature-responsive electrolyte is regarded, in the invention, as in the form of an aqueous solution.

In the invention, in the case of using a temperature-responsive electrolyte in the form of an aqueous solution, the aqueous solution of the temperature-responsive electrolyte is used in the state of being contained in an adequate vessel.

FIG. 1 diagrammatically shows an example in which an aqueous solution of a temperature-responsive electrolyte having acidic groups is used in the state of being contained in one vessel.

In the use example shown in FIG. 1, part of the vessel 1 which contains the aqueous solution of a temperature-responsive electrolyte is adjusted, with a cold source 2, to the phase transition temperature of the temperature-responsive electrolyte or lower, and another part of the vessel 1 is adjusted, with a heat source 3, to the phase transition temperature of the temperature-responsive electrolyte or higher, thereby giving a temperature gradient thereto.

Due to this temperature gradient, on the cold source 2 side within the vessel 1, protons ($H^+$) are released from the acidic groups of the temperature-responsive electrolyte, resulting in an increase in proton ($H^+$) concentration. Meanwhile, on the heat source 3 side within the vessel 1, the temperature-responsive electrolyte undergoes aggregation or the like to render protons ($H^+$) less apt to be released, resulting in an increase in $OH^-$ concentration. Namely, the pH within the vessel 1 is low on the cold source 2 side and is high on the heat source 3 side, thereby producing an ion concentration gradient.

A plurality of vessels (for example, two vessels) which contain an aqueous solution of a temperature-responsive electrolyte may be used.

Figure 2:
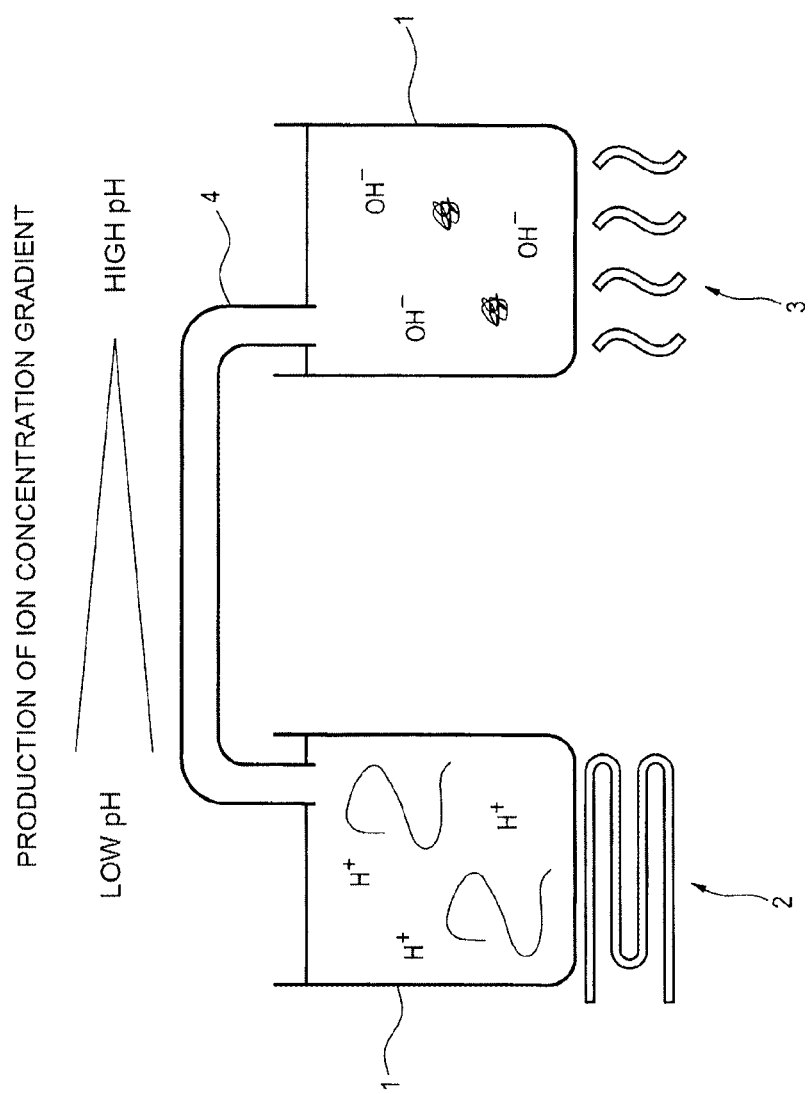
FIG. 2 is a diagrammatic view which illustrates another example of the ion concentration gradient generator of the invention.

FIG. 2 diagrammatically shows an example in which a plurality of vessels (for example, two vessels) that contain an aqueous solution of a temperature-responsive electrolyte having acidic groups are used.

In the use example shown in FIG. 2, a part of a plurality of vessels containing an aqueous solution of a temperature-responsive electrolyte (for example, one of two vessels) is adjusted, with a cold source 2, to the phase transition temperature of the temperature-responsive electrolyte or lower, and another part of the plurality of vessels (for example, the other of the two vessels) is adjusted to the phase transition temperature of the temperature-responsive electrolyte or higher, thereby giving a temperature gradient thereto.

Due to this temperature gradient, in the vessel 1 which is cooled with the cold source 2, protons ($H^+$) are released from the acidic groups of the temperature-responsive electrolyte, resulting in an increase in proton ($H^+$) concentration. Meanwhile, in the vessel 1 which is heated with a heat source 3, the temperature-responsive electrolyte undergoes aggregation or the like, to render protons ($H^+$) less apt to be released, resulting in an increase in $OH^-$ concentration. Namely, the aqueous solution has a reduced pH in the vessel 1 cooled with the cold source 2 and has an increased pH in the vessel 1 heated with the heat source 3, thereby producing an ion concentration gradient.

In the case where a temperature gradient such as that shown in FIG. 2 is given, it is preferred that the device should have a connecting member 4 by which the vessel 1 cooled with the cold source 2 and the vessel 1 heated with the heat source 3 are connected to each other in order that the temperature-responsive electrolyte and ions be capable of moving between the two vessels.

As the connecting member 4, for example, a tube or the like can be used. In cases when the two solutions which differ in temperature from each other are connected with a tube, a pH concentration gradient is generated between the solutions although the two solutions are continuous, so long as there is a temperature difference between the solutions. Thus, two solutions differing in pH can be yielded from one kind of solution.

In the use examples shown in FIG. 1 and FIG. 2, a temperature-responsive electrolyte having acidic groups is used to produce a proton ($H^+$) ion concentration gradient. However, the technique of the invention can be applied not only to the production of a proton ($H^+$) ion concentration gradient but also production of a gradient of the concentration of various kinds of ions.

Figure 25:
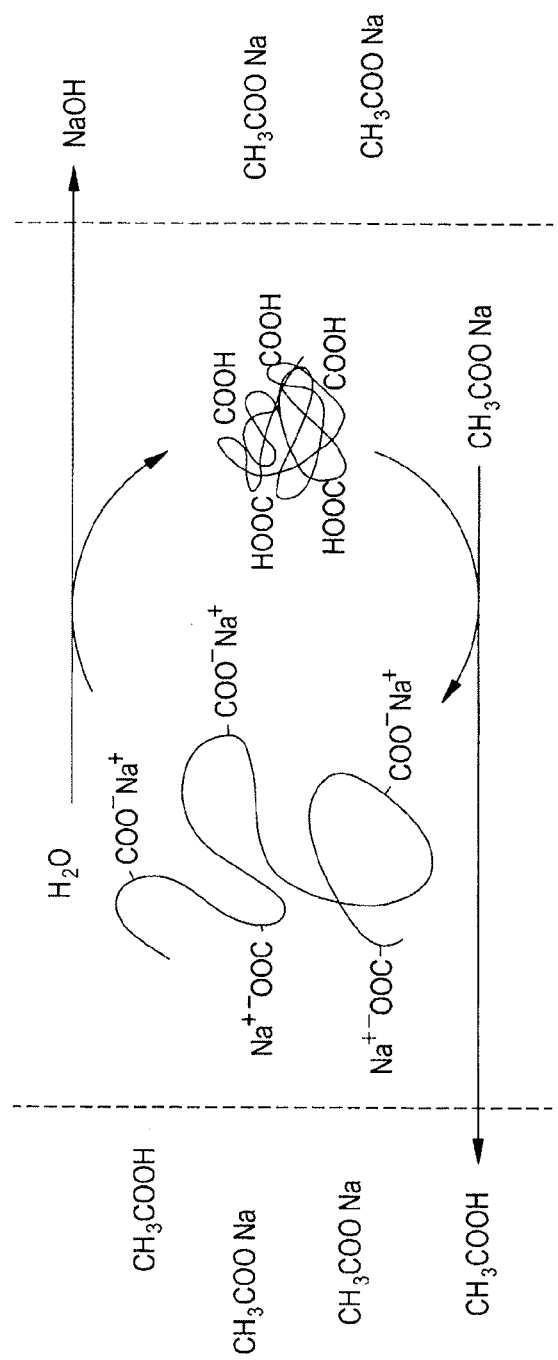
FIG. 25 is a diagrammatic view which illustrates behaviors of a temperature-responsive electrolyte and low-molecular weight ions in an embodiment in which a semipermeable membrane is used.

As shown in FIG. 25, in cases when a temperature-responsive electrolyte is added to an aqueous solution of, for example, sodium chloride, sodium iodide, or sodium acetate and a temperature gradient is produced, it is possible to move sodium ions and hydroxide ions to one side and acetic acid ions and protons to the opposite side in a proportion according to the temperature gradient (FIG. 25). Namely, an aqueous sodium acetate solution, for example, can be separated into an aqueous solution having a high acetic acid concentration and an aqueous solution having a high sodium hydroxide concentration, using the temperature gradient as an energy source. In this operation, in cases when a semipermeable membrane which is permeable to ions but is impermeable to the temperature-responsive electrolyte is used, the acid and base yielded can be continuously separated from the temperature-responsive electrolyte. Consequently, this technique can be applied as a method for separating a salt solution into a base and an acid solution using a temperature difference, in place of electrolytic processes. Examples of the semipermeable membrane include ultrafiltration membranes, microfiltration membranes, and dialysis membranes. Examples of membrane structure include flat membranes, hollow fiber membranes, spiral membranes, and tubular membranes.

As stated above, in the case of an embodiment of the invention which includes a vessel that contains an aqueous solution of a temperature-responsive electrolyte, it is preferred that the inside of the vessel should have been partitioned into a plurality of sections with a semipermeable membrane which is permeable to ions but impermeable to the temperature-responsive electrolyte.

Figure 3:
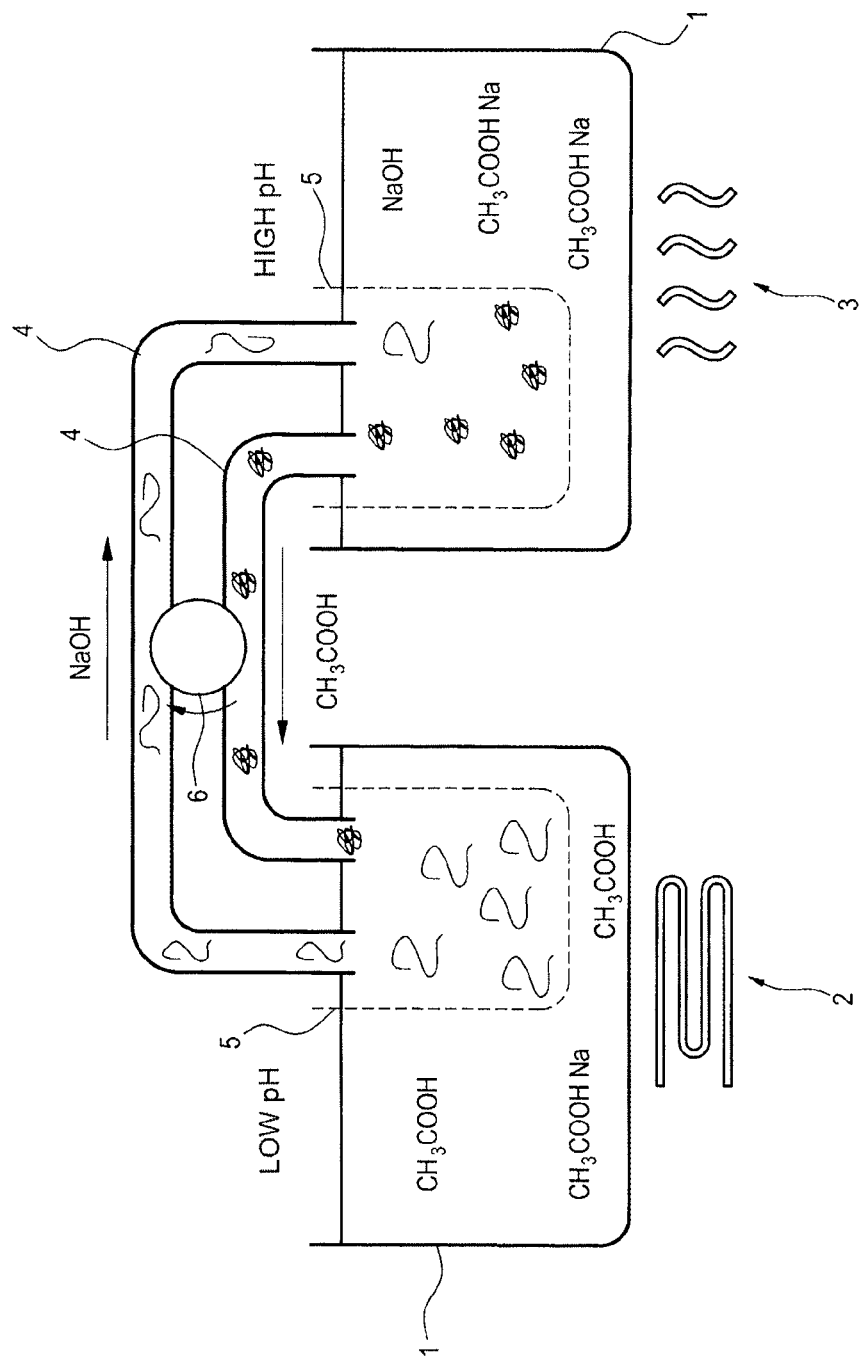
FIG. 3 is a diagrammatic view which illustrates still another example of the ion concentration gradient generator of the invention.

FIG. 3 diagrammatically shows an example wherein the inside of each vessel containing an aqueous solution of a temperature-responsive electrolyte has been partitioned into a plurality of sections with a semipermeable membrane which is permeable to ions but impermeable to the temperature-responsive electrolyte.

The use example shown in FIG. 3 is equal to the use example shown in FIG. 2 in the following points: a part of a plurality of vessels containing an aqueous solution of a temperature-responsive electrolyte (for example, one of two vessels) is adjusted, with a cold source 2, to the phase transition temperature of the temperature-responsive electrolyte or lower, and another part of the plurality of vessels (for example, the other of the two vessels) is adjusted to the phase transition temperature of the temperature-responsive electrolyte or higher; and the device has a connecting member 4 by which the vessel 1 cooled with the cold source 2 and the vessel 1 heated with a heat source 3 have been connected to each other.

The use example shown in FIG. 3 has, besides the feature of the use example shown in FIG. 2, a feature wherein the inside of each vessel 1 has been partitioned into a plurality of sections with a semipermeable membrane 5 which is permeable to ions but impermeable to the temperature-responsive electrolyte.

The aqueous solution of a temperature-responsive electrolyte, in the use example shown in FIG. 3, is not a solution which contains the temperature-responsive electrolyte only but a solution which further contains sodium acetate.

In this use example, two connecting members 4 may be disposed to configure the device so that the solution is moved in one direction through each connecting member 4 by means of a pump 6.

In the use example shown in FIG. 3, acetic acid ions and protons can be moved to the vessel 1 cooled with the cold source 2 and sodium ions and hydroxide ions can be moved to the vessel 1 heated with the heat source 3, in a proportion according to the temperature gradient, and the acid and base yielded are continuously separated from the temperature-responsive electrolyte by means of the semipermeable membranes 5.

Incidentally, although the use example shown in FIG. 3 includes two vessels 1 which contain an aqueous solution of a temperature-responsive electrolyte and the vessels 1 each have been partitioned with a semipermeable membrane 5, an example is possible in which only one vessel 1 is included and this vessel 1 has been partitioned with a semipermeable membrane 5.

Figure 4:
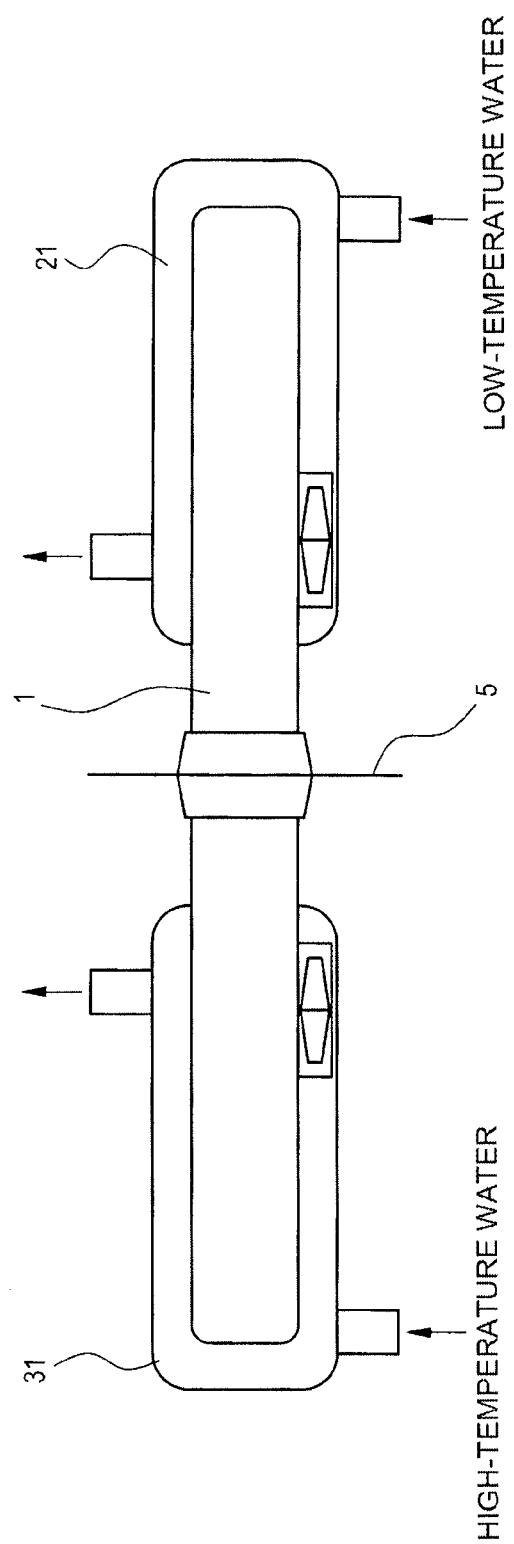
FIG. 4 is a diagrammatic view which illustrates a further example of the ion concentration gradient generator of the invention.

FIG. 4 diagrammatically shows one example in which only one vessel 1 that contains an aqueous solution of a temperature-responsive electrolyte is included and this vessel 1 has been partitioned with a semipermeable membrane 5. The use example shown in FIG. 4 includes one vessel 1 that contains an aqueous solution of a temperature-responsive electrolyte, the vessel 1 having a horizontally elongated shape, and the inside of the vessel 1 has been divided at the center into two parts with a semipermeable membrane 5 to form two cells. This device has a cold source means 21 and a heat source means 31 so that the cold source means 21 covers the outer periphery of a portion of the vessel 1 and that the heat source means 31 covers the outer periphery of another portion of the vessel 1. Low-temperature water and high-temperature water are supplied respectively to the cold source means 21 and the heat source means 31 to give a temperature gradient to the entire inside of the vessel 1.

Figure 5:
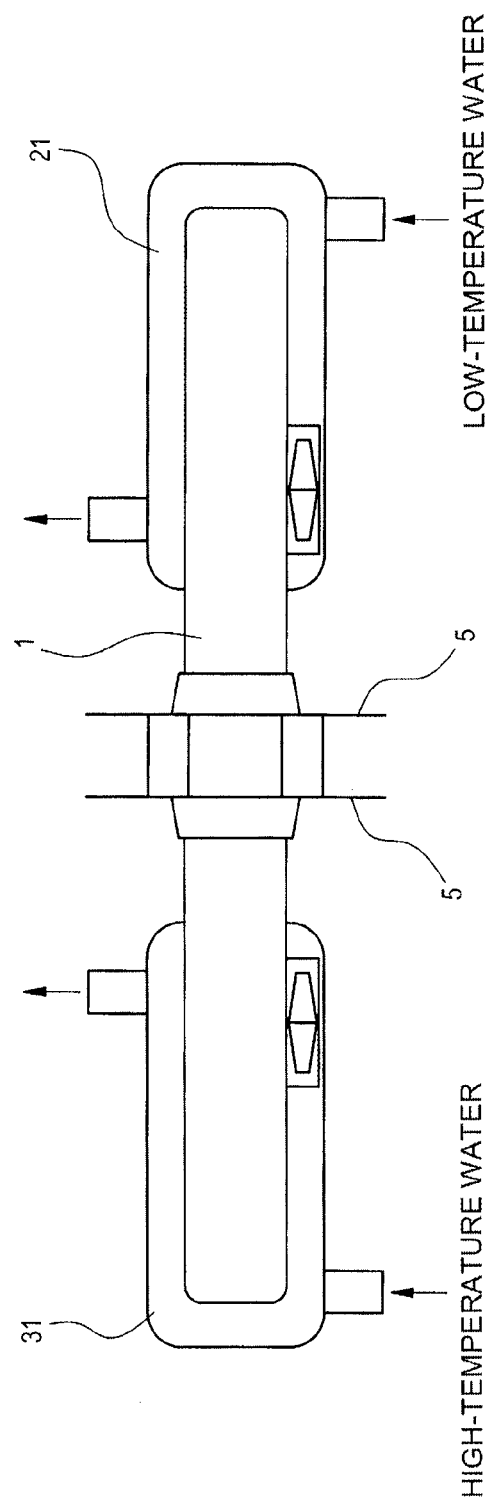
FIG. 5 is a diagrammatic view which illustrates still a further example of the ion concentration gradient generator of the invention.

FIG. 5 diagrammatically shows another example in which only one vessel 1 that contains an aqueous solution of a temperature-responsive electrolyte is included and this vessel 1 has been partitioned with a semipermeable membrane 5.

The use example shown in FIG. 5 is equal to the use example shown in FIG. 2 in that the use example shown in FIG. 5 has one vessel 1 having a horizontally elongated shape and further has a cold source means 21 and a heat source means 31.

The use example shown in FIG. 5 has, in a central part thereof, a section formed by partition with two semipermeable membranes 5. In the use example shown in FIG. 5, the solution contained in the vessel 1 is a basic solution. The temperature-responsive electrolyte is contained not in the whole of the solution contained in the vessel 1 but in only the central section formed by partition with the two semipermeable membranes 5.

Examples in which a temperature-responsive electrolyte is used in the form of an aqueous solution were described above. However, there are cases where use of a temperature-responsive electrolyte in the form of an aqueous solution poses a problem concerning utilization due to liquid leakage or results in a decrease in process efficiency due to the high viscosity or foaming properties of the solution.

This problem is overcome by using a temperature-responsive electrolyte in the form of a solid phase (solid).

Examples in which a temperature-responsive electrolyte is used in the form of a solid phase (solid) in the invention are explained below.

Incidentally, the expression "a temperature-responsive electrolyte is used in the form of a solid phase" in the invention includes use of a temperature-responsive electrolyte in the state of a hydrogel.

Figure 6:
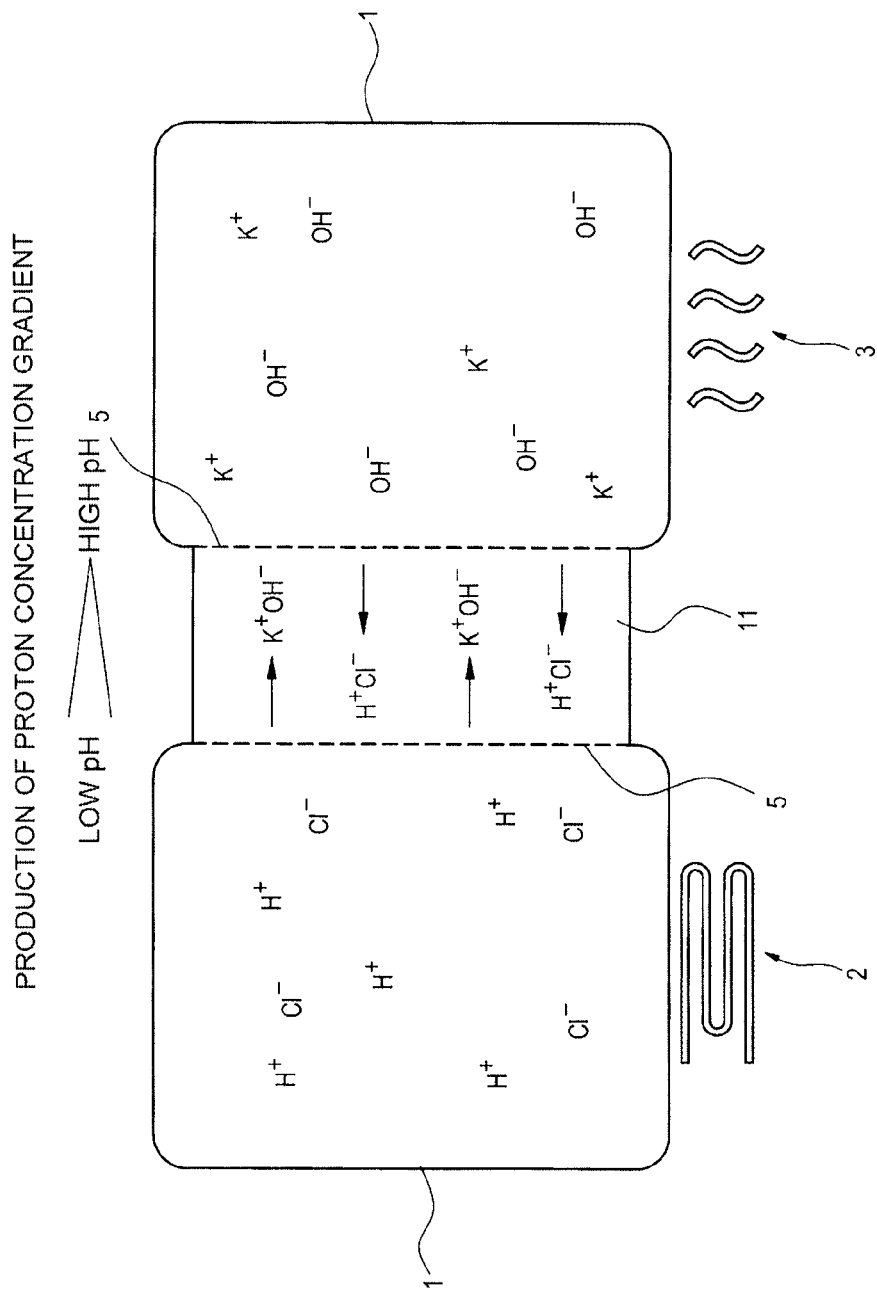
FIG. 6 is a diagrammatic view which illustrates still a further example of the ion concentration gradient generator of the invention.

FIG. 6 diagrammatically shows an example in which a temperature-responsive electrolyte is used in the form of a solid phase.

In the use example shown in FIG. 6, the device has a plurality of vessels 1 (for example, two vessels) containing an aqueous salt (KCl or NaCl) solution, and the plurality of (for example, two) vessels 1 are connected with a solid phase of a temperature-responsive electrolyte (referred to also as temperature-responsive solid electrolyte) 11. A part of the plurality of vessels 1 (for example, one of the two vessels) is adjusted to the phase transition temperature of the temperature-responsive electrolyte or lower with a cold source 2, and another part of the plurality of vessels 1 (for example, the other of the two vessels) is adjusted to the phase transition temperature of the temperature-responsive electrolyte or higher, thereby giving a temperature gradient.

In the use example shown in FIG. 6, the temperature-responsive solid electrolyte 11 may be sandwiched between semipermeable membranes 5.

In cases when the temperature-responsive solid electrolyte 11 is sandwiched between semipermeable membranes 5 and this structure is sandwiched between two aqueous salt solutions which differ in temperature, that is, a temperature gradient is given thereto, then a large pH concentration gradient is produced between the two solutions so long as the aqueous salt solutions have different temperatures that are respectively on both sides of the phase transition temperature. This pH difference was maintained even after the salt solutions were separated from the solid electrolyte. It is hence thought that the potassium ions (or sodium ions) and chloride ions in the solutions were transported in accordance with temperature changes to produce the pH concentration gradient.

Although the use example shown in FIG. 6 is intended to produce a proton ($H^+$) ion concentration gradient, the technique of the invention can be applied not only to the production of a proton ($H^+$) ion concentration gradient but also to production of a gradient of the concentration of any of various ions.

For example, in cases when a temperature-responsive solid electrolyte 11 is added to an aqueous sodium acetate solution and a temperature gradient is produced, it is possible to move sodium ions and hydroxide ions to one side and acetic acid ions and protons to the opposite side in a proportion according to the temperature gradient. Namely, an aqueous sodium acetate solution can be separated into an aqueous solution having a high acetic acid concentration and an aqueous solution having a high sodium hydroxide concentration, using the temperature gradient as an energy source. Furthermore, the acid and base thus yield can be continuously separated from the temperature-responsive solid electrolyte 11. Consequently, this technique also can be applied as a method for separating a salt solution into a basic solution and an acidic solution, in place of electrolytic processes.

Embodiments of the invention in which a temperature-responsive solid electrolyte is used include the use example shown in FIG. 5 in which the aqueous solution of a temperature-responsive electrolyte has been replaced with a hydrogel of a temperature-responsive electrolyte, besides the use example shown in FIG. 6.

The technique of the invention can be applied to various fields including batteries, recovery of an acid gas such as carbon dioxides, and separation of ions.

In particular, the technique of the invention can be used for heightening the efficiency of thermovoltaic cells or fuel cells by utilizing a potential difference produced by the production of an ion concentration gradient according to the technique.

In most batteries including thermovoltaic cells and fuel cells, oxidation-reduction reactions occur on the electrode surfaces and, simultaneously therewith, the pH of the electrolyte changes. If this pH change can always be neutralized, the oxidation-reduction equilibrium changes on the Le Chatelier principle and the reactions can be accelerated. According to the invention, by applying a slight temperature difference between the electrodes of a battery, a pH gradient can be continuously produced and, hence, highly efficient energy conversion is rendered possible.

Figure 26:
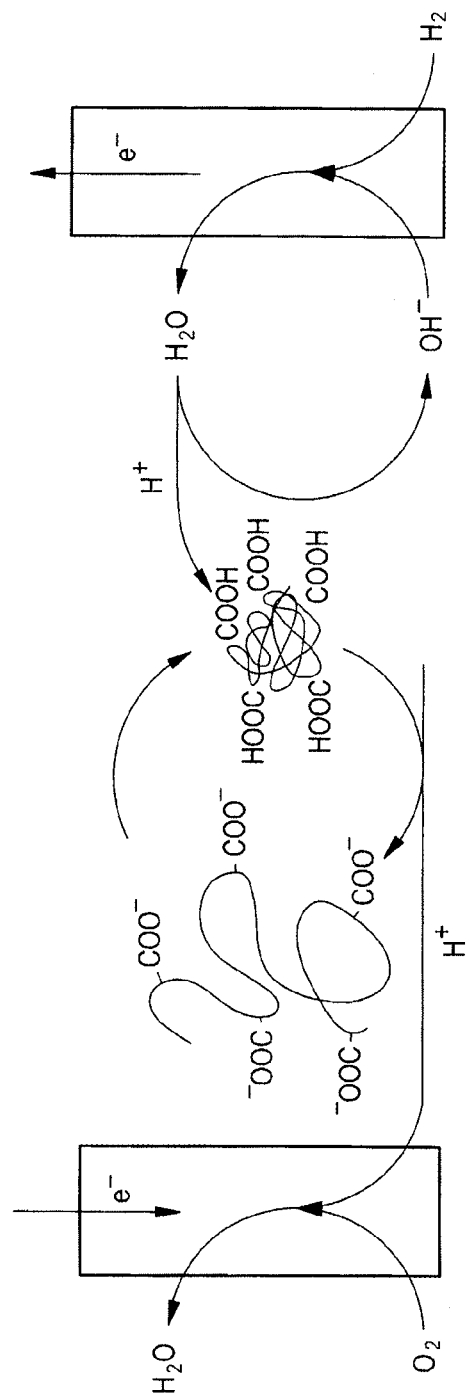
FIG. 26 is a diagrammatic view which illustrates behaviors of a temperature-responsive electrolyte and low-molecular weight ions in an example in which the invention has been applied to a fuel cell.

For example, in the case where a temperature-responsive electrolyte having carboxylic acid groups is used in a fuel cell and a temperature gradient is produced between the electrodes, a proton concentration gradient is produced between each electrode of the fuel cell and the aqueous solution of the temperature-responsive electrolyte and the electrode reactions on both the positive and the negative electrodes are accelerated as shown in FIG. 26. As a result, the efficiency of the fuel cell is heightened.

Figure 7:
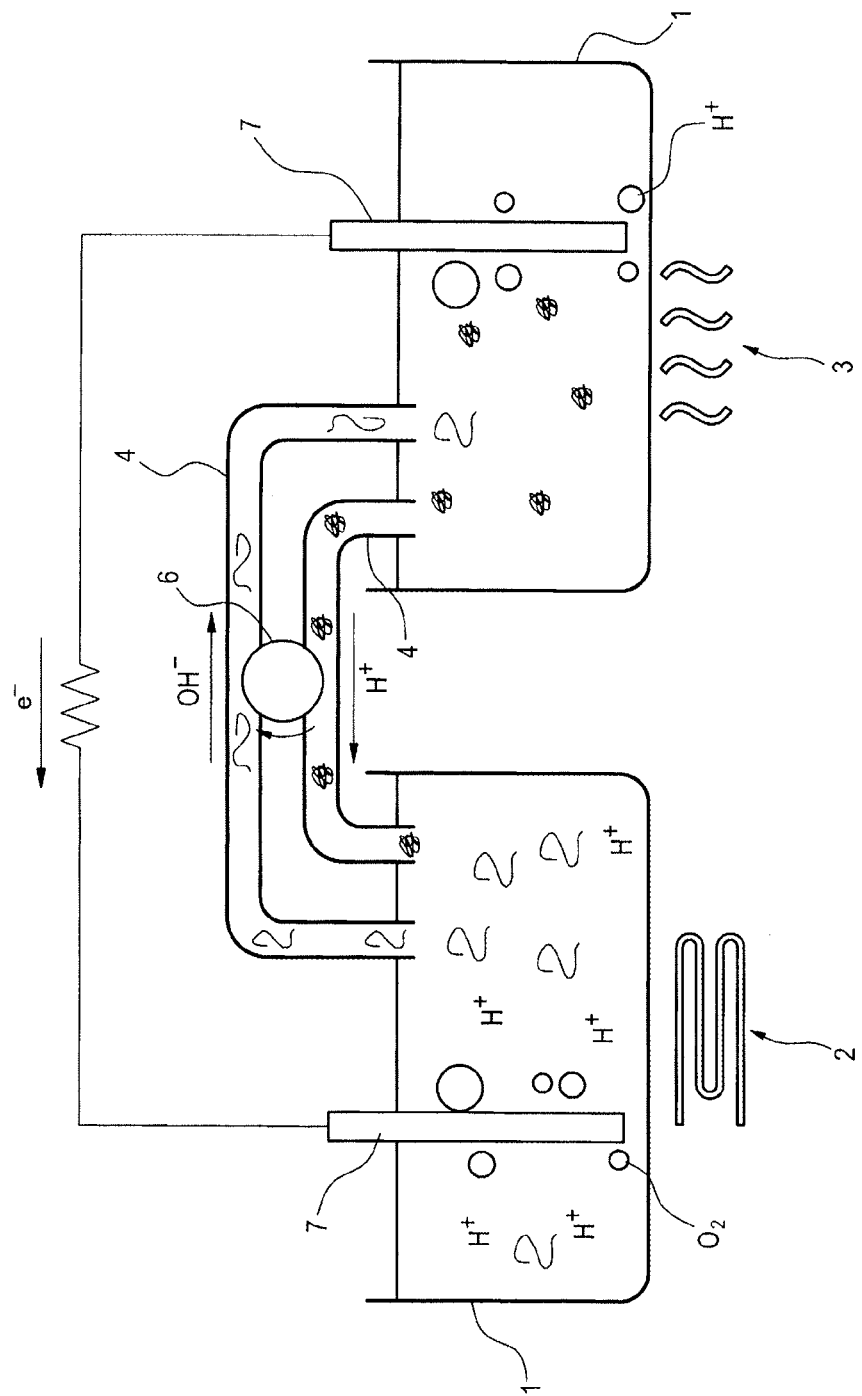
FIG. 7 is a diagrammatic view which illustrates an example in which the invention is applied to a battery.

FIG. 7 diagrammatically shows an example in which the technique of the invention is applied to a battery.

In the use example shown in FIG. 7, one of two vessels 1 containing an aqueous solution of a temperature-responsive electrolyte is adjusted to the phase transition temperature of the temperature-responsive electrolyte or lower with a cold source 2, and the other vessel 1 is adjusted to the phase transition temperature of the temperature-responsive electrolyte or higher. Furthermore, two connecting members 4 by which the vessel 1 cooled with the cold source 2 and the vessel 1 heated with a heat source 3 are connected to each other have been disposed to configure the device so that the solution is moved in one direction through each connecting member 4 by means of a pump 6. Moreover, this device has an electrode 7 in each of the vessel 1 cooled with the cold source 2 and the vessel 1 heated with the heat source 3, and these electrodes 7 are electrically connected.

Next, an embodiment in which the technique of the invention is applied to recovery of an acid gas such as carbon dioxide is explained. In particular, the embodiment is explained below in detail with respect to carbon dioxide as an example of the acid gas.

Figure 15:
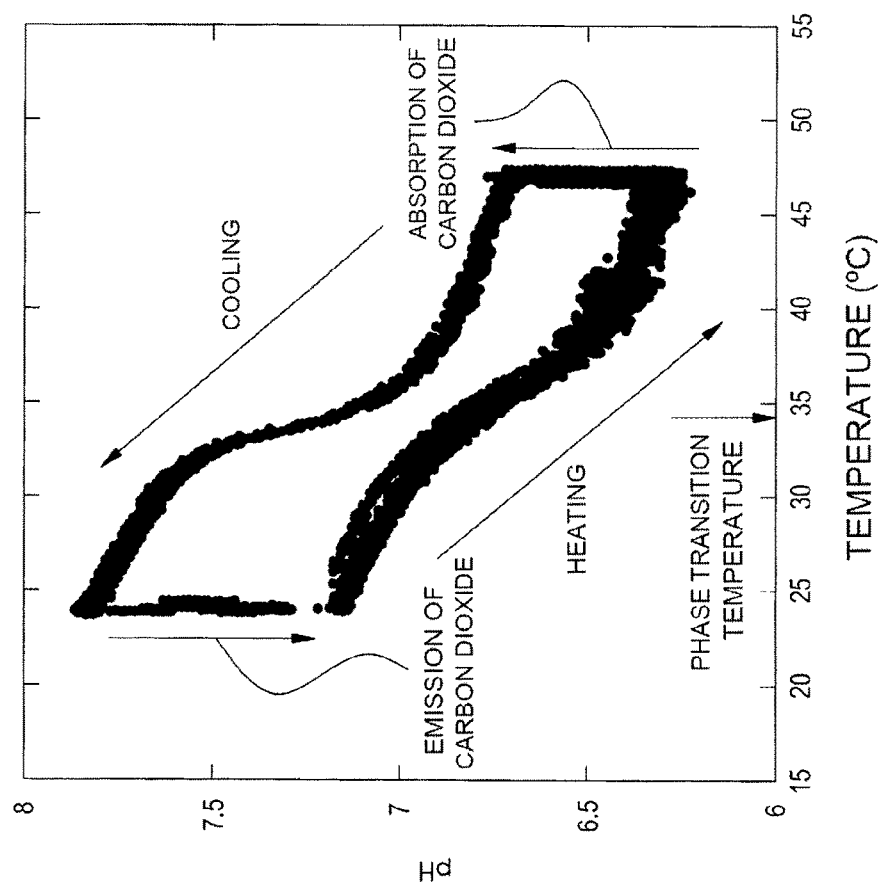
FIG. 15 is a graph which shows the temperature-dependent absorption and emission of carbon dioxide and solution pH changes in one example in which the invention has been applied to recovery of carbon dioxide.

In a low-temperature range, the solution of a temperature-responsive electrolyte having a basic group is basic and hence readily absorbs carbon dioxide from the gaseous phase. However, in cases when the solution is heated to a temperature not lower than the phase transition temperature, the solution becomes neutral or acidic and, hence, the dissolved carbon dioxide can be efficiently recovered (FIG. 15). The absorption and recovery of carbon dioxide can be repeatedly conducted by heating or cooling the solution by several degrees centigrade to cause a phase transition (FIG. 15). It is absolutely necessary, for preventing the global warming, to establish a technique for absorbing the carbon dioxide discharged from internal combustion engines. Consequently, if it becomes possible according to the invention to absorb the carbon dioxide while utilizing the waste heat from the internal combustion engines, a system is rendered possible in which carbon dioxide is recovered at low cost not only from large-scale factories, such as electric power plants and ironworks, but also from motor vehicles and domestic electric-power generation systems.

Figure 8:
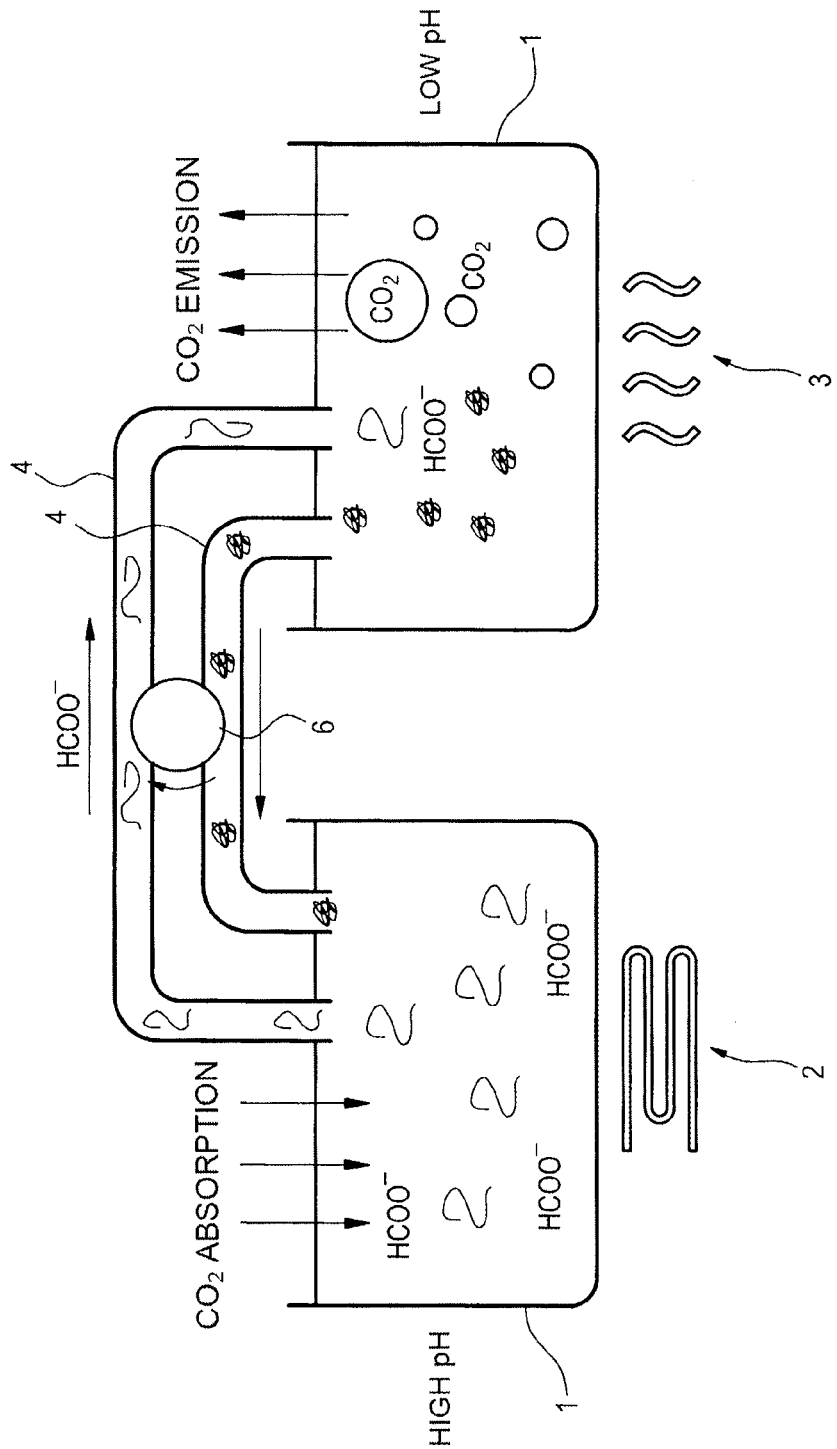
FIG. 8 is a diagrammatic view which illustrates an example in which the invention is applied to recovery of carbon dioxide.

FIG. 8 diagrammatically shows an example in which the technique of the invention is applied to recovery of carbon dioxide.

In the use example shown in FIG. 8, one of two vessels 1 containing an aqueous solution of a temperature-responsive electrolyte having a basic group is adjusted to the phase transition temperature of the temperature-responsive electrolyte or lower with a cold source 2, and the other vessel 1 is adjusted to the phase transition temperature of the temperature-responsive electrolyte or higher. Furthermore, two connecting members 4 by which the vessel 1 cooled with the cold source 2 and the vessel 1 heated with a heat source 3 are connected to each other have been disposed to configure the device so that the solution is moved in one direction through each connecting member 4 by means of a pump 6. The solution in the vessel 1 cooled with the cold source 2 came to have an elevated pH and became capable of efficiently absorbing carbon dioxide. In cases when the aqueous solution of the temperature-responsive electrolyte into which carbon dioxide has been absorbed is heated with the heat source 3, the pH thereof decreases and the carbon dioxide can be easily released from the solution. The solution from which the carbon dioxide has been released is cooled with the cold source 2 and is thereby rendered reusable for the absorption of carbon dioxide.

The use example shown in FIG. 8 is an embodiment in which a temperature-responsive electrolyte having a basic group is used in the state of an aqueous solution. In this embodiment, however, for improving the absorbency of the carbon dioxide absorbent liquid, it is necessary to heighten the concentration of the electrolyte. There are cases where an increase in the electrolyte concentration of the aqueous solution results in an increase in solution viscosity or foaming property to render the recovery of carbon dioxide by a gas-liquid process inefficient. This problem concerning solution viscosity or foaming properties can be eliminated by forming a temperature-responsive electrolyte into a solid (gel-state) film, thereby rendering more efficient recovery of carbon dioxide possible.

Figure 27:
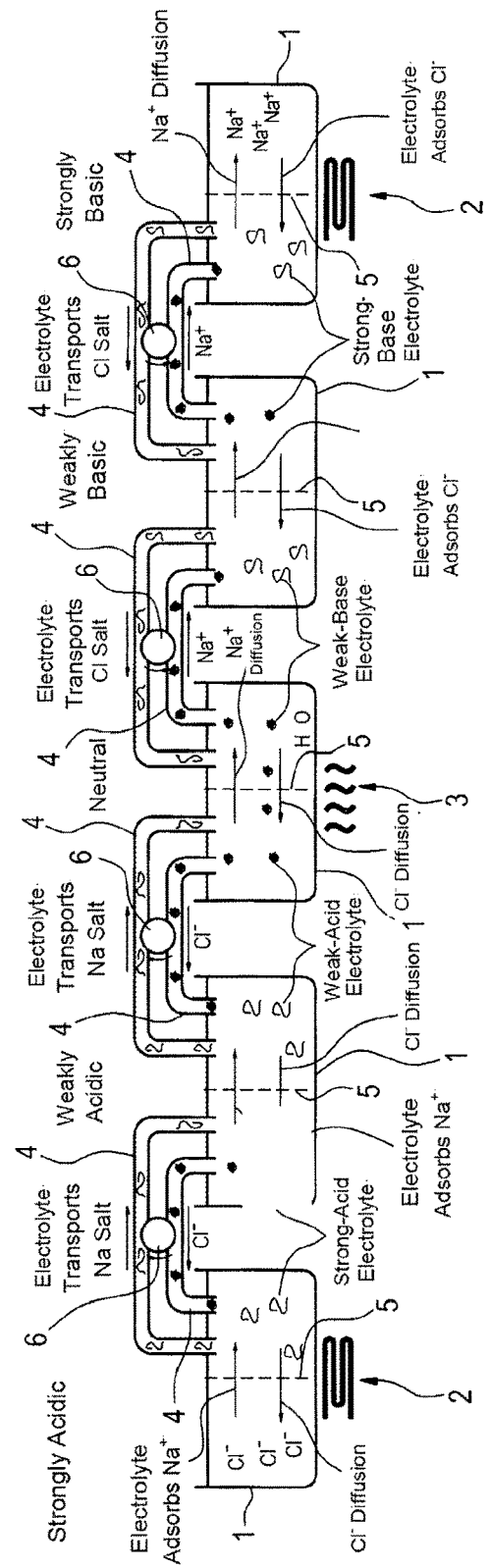
FIG. 27 is a diagrammatic view which illustrates an example of multistage ion transportation systems employing a large number of temperature-responsive electrolytes and vessels.

Still a further possible embodiment of the invention is a multistage ion transportation system such as that shown in FIG. 27. The multistage ion transport system shown in FIG. 27 employs a combination of four kinds of temperature-responsive nanoparticles having different phase transition temperatures and different values of pKa (acidity/basicity). An aqueous solution of a temperature-responsive electrolyte which has a phase transition temperature in a low-temperature range and is strongly acidic is circulated between the leftmost vessel 1 in FIG. 27 and the second vessel 1 from the left. An aqueous solution of a temperature-responsive electrolyte which has a phase transition temperature in a high-temperature range and is weakly acidic is circulated between the second vessel 1 from the left and the central vessel 1. An aqueous solution of a temperature-responsive electrolyte which has a phase transition temperature in a high-temperature range and is weakly basic is circulated between the central vessel 1 and the second vessel 1 from the right. An aqueous solution of a temperature-responsive electrolyte which has a phase transition temperature in a low-temperature range and is strongly basic is circulated between the second vessel 1 from the right and the rightmost vessel 1. The central vessel 1 is kept at the phase transition temperatures of all temperature-responsive electrolytes or lower, and the leftmost and rightmost vessels 1 are kept at the phase transition temperatures of all temperature-responsive electrolytes or higher. The electrolytes are separated from each other by a semipermeable membrane 5 which is a semipermeable membrane (broken line), and protons, hydroxide ions, and low-molecular weight ions only are transported in accordance with a temperature difference between the vessels.

Figure 28:
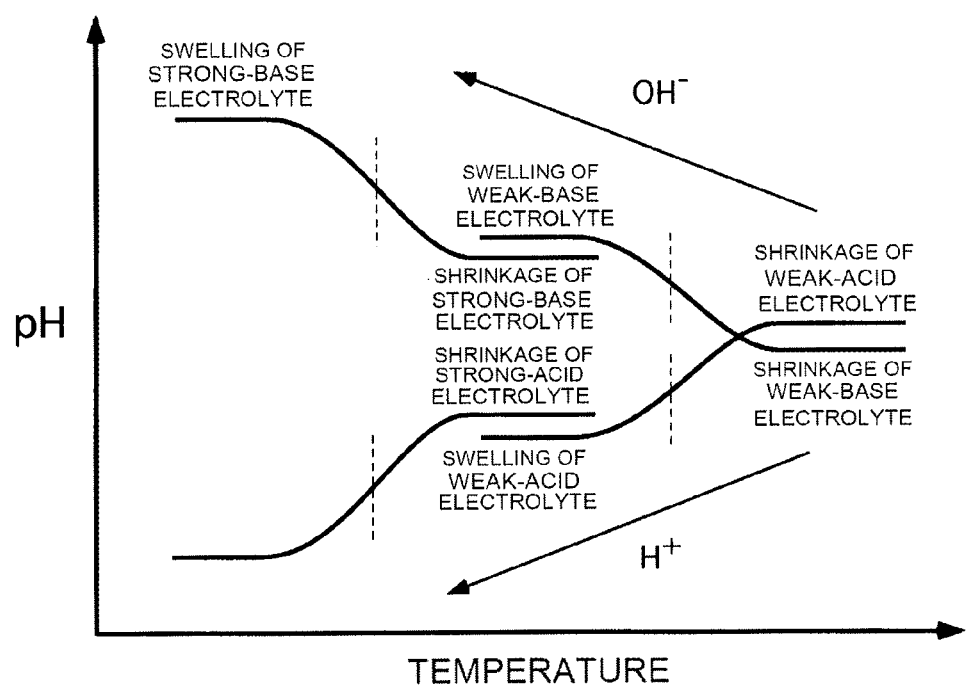
FIG. 28 is a diagram which shows a pH distribution of the temperature-responsive electrolyte within each vessel in the multistage ion transportation system shown in FIG. 27.

In FIG. 28 is shown a conception of the pH distributions of the temperature-responsive electrolytes present in the vessels 1 within the multistage ion transportation system. The broken lines in FIG. 28 indicate the phase transition temperatures of the electrolytes.

EXAMPLES

The results of evaluation tests using Examples according to the invention and Comparative Examples are shown below to explain the invention in more detail. Incidentally, the invention should not be construed as being limited to the following Examples.

Example 1

[Synthesis and Evaluation of Acidic Temperature-Responsive Nanoparticulate Electrolyte Containing Carboxylic Acid (Aqueous Solution of Nanoparticles Obtained by Copolymerizing 68 mol % N-isoprorylacrylamide, 10 mol % Acrylic Acid, 20 mol % N-t-butylacrylamide, Which is Highly Hydrophobic, and 2 mol % N,N'-methylenebisacrylamide as Crosslinking Agent)]

In 30 mL of ultrapure water were dissolved 120 mg of N-isoprorylacrylamide, 38.4 mg of N-t-butylacrylamide, 11 µL of acrylic acid, 4.6 mg of N,N'-methylenebisacrylamide, and 17.4 mg of sodium dodecyl sulfate. This solution was introduced into a 100-mL eggplant type flask, which was then tightly sealed with a septum. The contents were stirred with a magnetic stirrer while being heated at 70° C. on an oil bath, until the contents became even. After the contents had become even, two needles were stabbed into the septum to dispose the tip of one needle under the liquid surface and the tip of the other needle over the liquid surface, and nitrogen was externally introduced through the needle under the liquid surface and gently bubbled into the liquid to conduct degassing for 30 minutes. A solution prepared by dissolving 5.88 mg of 4,4'-azobis(4-cyanovaleic acid) in 0.6 mL of dimethyl sulfoxide was added to that solution through a needle. The needle other than the needle connected to nitrogen was wholly removed, and the contents were reacted at 70° C. for 3 hours in a nitrogen atmosphere. The septum was opened to thereby terminate the reaction. The reaction solution was introduced into a dialysis tube having an MWCO of 10,000 Da and dialyzed for 3 days while repeatedly replacing the water in a large amount, thereby removing the surfactant and unreacted monomers. The size (particle diameter) of the electrolyte nanoparticles in this solution was measured by the dynamic light-scattering method. The results of the measurement of the particle diameter of the nanoparticles are shown by the plot of (-o-) in FIG. 9. Furthermore, this solution of electrolyte nanoparticles was diluted 10 times with pure water, and the pH of the dilution was measured in a nitrogen atmosphere. The results of the measurement of the pH of the nanoparticle solution are shown by the plot of (-●-) in FIG. 9. Incidentally, the results of a measurement of the pH of ultrapure water in which acrylic acid (monomer) has been dissolved in the same amount as the carboxylic acid contained in that electrolyte are shown by the plot of (-□-) in FIG. 9.

Moreover, this solution was dissolved in 1 mM NaCl solution, and the pH of the resultant solution was measured. The results of this pH measurement are shown by the plot of (-●-) in FIG. 10. Furthermore, in FIG. 10, pH changes of the pure-water solution of nanoparticles with changing temperature are shown by the plot of (-o-), and pH changes of the pure-water solution of acrylic acid (monomer) with changing temperature are shown by the plot of (-□-).

Figure 11:
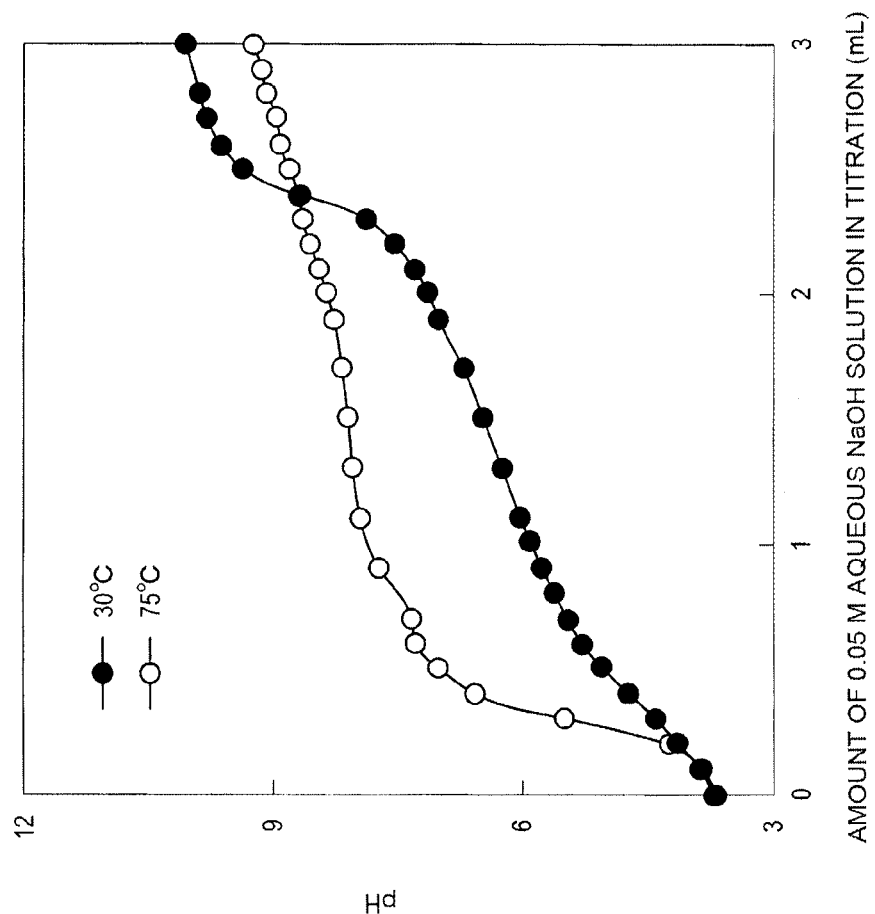
FIG. 11 is graphs which show the results of temperature-dependent pH titration of a solution of one example of the temperature-responsive nanoparticulate electrolytes usable in the invention.

The temperature-responsive nanoparticles were subjected to ion exchange with a strong cation-exchange resin and then to pH titration at 30° C. and 75° C. using 0.05 M aqueous NaOH solution. The results thereof are shown in FIG. 11. In FIG. 11, the results of the titration at 30° C. are shown by the plot of (-●-), and the results of the titration at 75° C. are shown by the plot of (-o-). In the results of the titration at 75° C., the apparent point of neutralization has clearly shifted leftward. It was hence understood that the substantial amount of the acid within the solution had decreased due to the shrinkage of the nanoparticles.

Figure 12:
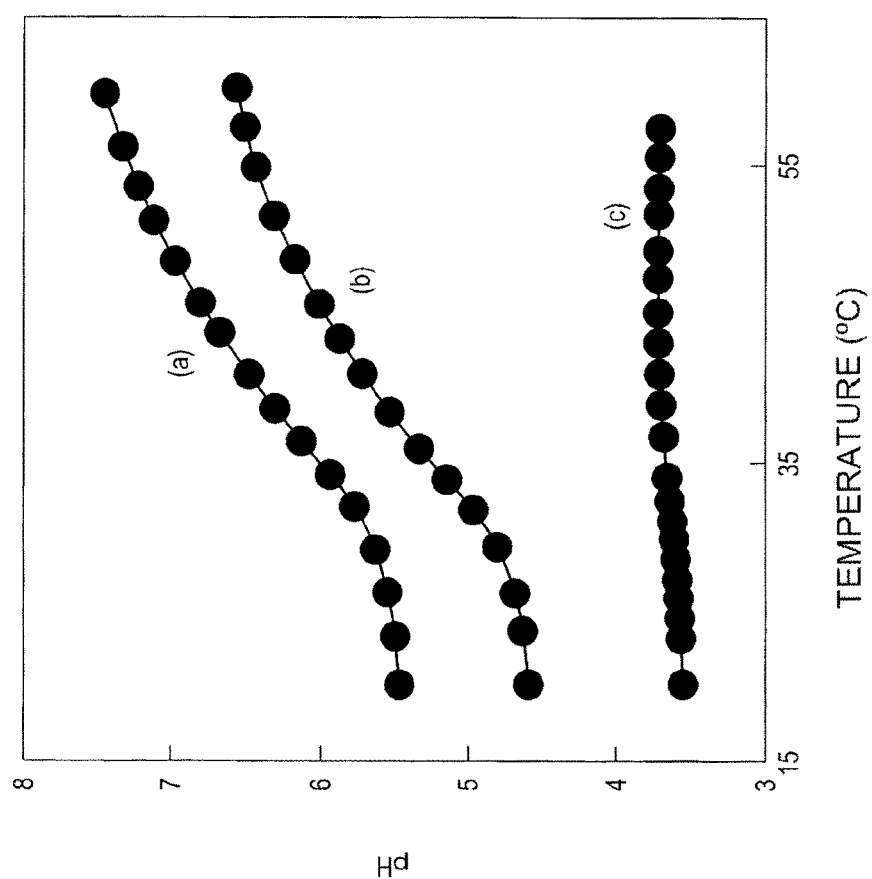
FIG. 12 is graphs which show the initial pH values and temperature-dependent pH changes of solutions of one example of the temperature-responsive nanoparticulate electrolytes usable in the invention.

Furthermore, this aqueous solution was subjected to ion exchange with a strong cation-exchange resin, and NaOH was thereafter added thereto in given amounts to adjust the pH of the solution to 5.5, 4.5, and 3.5 at room temperature. Each resultant solution was introduced into the vessel 1 of the device shown in FIG. 4, and the temperatures of the left-hand and right-hand portions were gradually changed. The pH in the low-temperature-side portion of the vessel 1 changed little even when the temperature of the high-temperature-side portion was changed. However, the pH responsiveness in the high-temperature-side portion of the vessel 1 changed as shown by each of (a), (b), and (c) in FIG. 12. A semipermeable membrane 5 was disposed between the left-hand and right-hand cells so that the polymer (temperature-responsive electrolyte nanoparticles) did not move and low-molecular weight ions only moved. In (a) and (b), the pH in the high-temperature-side portion of the vessel 1 came to rise abruptly at around the phase transition temperature when the temperature rose. In each of (a) to (c), the pH in the high-temperature-side portion of the vessel 1 during temperature declining showed the same pH-temperature profile as during the temperature rising.

Figure 13:
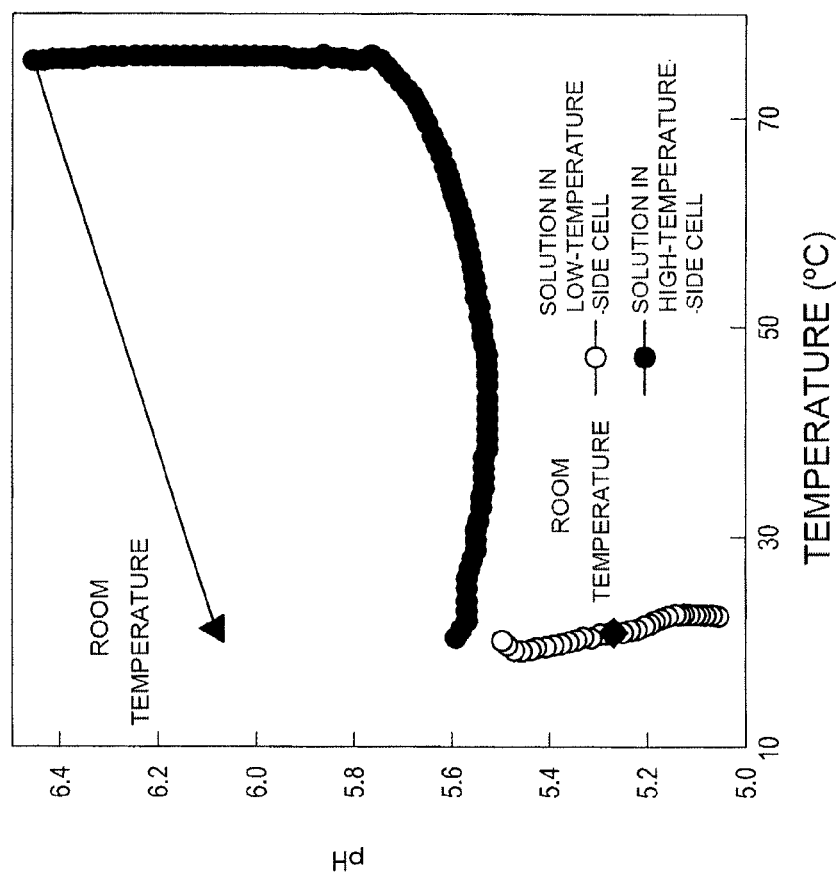
FIG. 13 is graphs which show temperature-dependent pH changes of a solution within the low-temperature-side cell and of a solution within the high-temperature-side cell, the pH changes having been observed when the device shown in FIG. 5 was used.

Moreover, this aqueous solution was subjected to ion exchange with a strong anion-exchange resin and then solidified by freeze drying. Two milliliters of 1 mM aqueous sodium iodide solution was added to 200 mg of the solid obtained, thereby producing a hydrogel. This hydrogel was sandwiched between semipermeable membranes and disposed in the central part of the device shown in FIG. 5 (the part sandwiched between the two semipermeable membranes 5). Fifty milliliters of 1-mM aqueous sodium iodide solution was introduced into each of the left-hand and right-hand cells located outside the semipermeable membranes 5. In FIG. 13 is shown the pH responsiveness of the solutions in the high-temperature-side and low-temperature-side cells which was observed when the temperature of the left-hand cell was rapidly elevated to 75° C. while keeping the temperature of the right-hand cell constant at 20° C. In FIG. 13, the pH of the solution in the high-temperature-side cell is shown by the plot of (-●-), and the pH of the solution in the low-temperature-side cell is shown by the plot of (-○-). A semipermeable membrane 5 was disposed between the hydrogel of temperature-responsive electrolyte nanoparticles and each of the left-hand and right-hand cells so that no polymer movement occurred and low-molecular weight ions only moved. The pH of the solution in the low-temperature-side cell declined as the temperature of the high-temperature-side cell was changed, and the pH of the solution in the high-temperature-side cell gradually rose after the temperature rising. After a pH difference (pH concentration gradient) was thus produced, the solutions were taken out of the cells and returned to 20° C. However, the pH values of the solutions did not return to the initial values. It can be seen from these results that iodine ions were distributed in a larger amount in the low-temperature-side cell and sodium ions were distributed in a larger amount in the high-temperature-side cell.

Example 2

[Synthesis and Evaluation of Basic Temperature-Responsive Nanoparticulate Electrolyte Containing Imidazole (Nanoparticles Obtained by Copolymerizing 93 mol % N-isoprorylacrylamide, 5 mol % 1-H-imidazole-4-N-acryloylethanamine, and 2 mol % N,N'-methylenebisacrylamide as Crosslinking Agent)]

The acrylamide having an imidazole group as a side chain (1-H-imidazole-4-N-acryloylethanamine) was synthesized by the condensation reaction of histamine with N-(acryloyloxy)succinimide in accordance with Wenhao Liu, et. Al., J. AM. CHEM. SOC., 2010, Vol. 132, p. 472-483. In 30 mL of ultrapure water were dissolved 985 mg of N-isoprorylacrylamide, 76.4 mg of the 1-H-imidazole-4-N-acryloylethanamine, 29 mg of N,N'-methylenebisacrylamide, and 21.9 mg of cetyltrimethylammonium bromide. This solution was introduced into a 100-mL eggplant type flask, which was then tightly sealed with a septum. The contents were stirred with a magnetic stirrer while being heated at 70° C. on an oil bath, until the contents became even. After the contents had become even, two needles were stabbed into the septum to dispose the tip of one needle under the liquid surface and the tip of the other needle over the liquid surface, and nitrogen was externally introduced through the needle under the liquid surface and gently bubbled into the liquid to conduct degassing for 30 minutes. A solution prepared by dissolving 21 mg of 2,2'-azobis(propane-2-carbamidine)dihydrochloride in 0.3 mL of ultrapure water was added to that solution through a needle. The needle other than the needle connected to nitrogen was wholly removed, and the contents were reacted at 70° C. for 3 hours in a nitrogen atmosphere. The septum was opened to thereby terminate the reaction. The reaction solution was introduced into a dialysis tube having an MWCO of 10,000 Da and dialyzed for 3 days while repeatedly replacing the water in a large amount, thereby removing the surfactant and unreacted monomers. This solution of electrolyte nanoparticles was diluted with pure water so as to result in a nanoparticle concentration of 10 mg/mL, and all anions were removed therefrom with a strong anion-exchange resin. Thereafter, the resultant solution was examined for pH change with changing temperature, while conducting nitrogen bubbling. The results thereof are shown in FIG. 14. It can be seen from FIG. 14 that the pH declined abruptly after the temperature exceeded the phase transition temperature (30° C.).

Next, air (containing carbon dioxide) was bubbled overnight at a constant temperature of 24° C., and the pH of this solution was thereafter measured while changing the temperature and while continuing the air bubbling. The results thereof are shown in FIG. 15. It can be seen that the pH declined because the solution absorbed carbon dioxide in the low-temperature range, and upon temperature rising, the pH abruptly declined at around the phase transition temperature because of a change in polymer structure. It can also be seen that the decrease in pH causes emission of the carbon dioxide, resulting in an increase in the pH of the solution, and that upon temperature declining, the pH of the solution rises due to a change in polymer structure to render the solution capable of absorbing carbon dioxide again.

Example 3

[Synthesis and Evaluation of Basic Temperature-Responsive Polymer Electrolyte Containing Amine Group (Linear Polymer Obtained by Copolymerizing 95 mol % N-isoprorylacrylamide and 5 mol % N-[3-(dimethylamino)propyl]methacrylamide (DMAPM))]

In 30 mL of methanol were dissolved N-isoprorylacrylamide and DMAPM in amounts of 95 mol % and 5 mol % respectively (monomer phase concentration, 312 mM). This solution was introduced into a 100 mL eggplant type flask, which was then tightly sealed with a septum. Two needles were stabbed into the septum to dispose the tip of one needle under the liquid surface and the tip of the other needle over the liquid surface, and nitrogen was externally introduced through the needle under the liquid surface and gently bubbled into the liquid to conduct degassing for 30 minutes. Subsequently, in a nitrogen atmosphere, while the contents were being heated on an oil bath with refluxing, a solution prepared by dissolving 10 mg of azobisisobutyronitrile in 0.3 mL of methanol was added to that solution through a needle. The needle other than the needle connected to nitrogen was wholly removed, and the contents were reacted at 70° C. for 3 hours in a nitrogen atmosphere. The septum was opened to thereby terminate the reaction, and the methanol was distilled off under reduced pressure. The residue was dissolved in pure water, and this reaction solution was introduced into a dialysis tube having an MWCO of 10,000 Da and dialyzed for 3 days while repeatedly replacing the pure water in a large amount, thereby removing the unreacted monomers. The solution obtained was freeze-dried. The polymer obtained was dissolved in water and diluted with pure water so as to result in a concentration of 10 mg/mL, and all anions were removed therefrom with a strong anion-exchange resin. Thereafter, the solution having a temperature of 30° C. or 75° C. was subjected to pH titration with an aqueous hydrochloric acid solution while conducting nitrogen bubbling. The results thereof are shown in FIG. 16. In FIG. 16, the results of the titration of the 30° C. solution are shown by the plot of (-○-), and the results of the titration of the 75° C. solution are shown by the plot of (-●-). Incidentally, the abscissa in FIG. 16 indicates the molar amount of HCl used for titration per g of the polymer. The apparent pKa value of the 75° C. solution was 6.8, which was smaller by about 2 than the pKa value of 8.8 for the 30° C. solution. This means that the proton concentration can be changed 100 times.

Example 4

[Synthesis and Evaluation of Basic Temperature-Responsive Nanoparticulate Electrolyte Containing Amine Group (Nanoparticles Obtained by Copolymerizing 93 mol % N-isoprorylacrylamide, 5 mol % DMAPM, and 2 mol % N,N'-methylenebisacrylamide as Crosslinking Agent)]

In 30 mL of pure water were dissolved N-isoprorylacrylamide, DMAPM, and N,N'-methylenebisacrylamide in amounts of 93 mol %, 5 mol %, and 2 mol % respectively (monomer phase concentration, 312 mM). Therein was dissolved 21.9 mg of cetyltrimethylammonium bromide. This solution was introduced into a 100-mL eggplant type flask, which was then tightly sealed with a septum. The contents were stirred with a magnetic stirrer while being heated at 70° C. on an oil bath, until the contents became even. After the contents had become even, two needles were stabbed into the septum to dispose the tip of one needle under the liquid surface and the tip of the other needle over the liquid surface, and nitrogen was externally introduced through the needle under the liquid surface and gently bubbled into the liquid to conduct degassing for 30 minutes. A solution prepared by dissolving 21 mg of 2,2'-azobis(propane-2-carbamidine)dihydrochloride in 0.3 mL of ultra-pure water was added to that solution through a needle. The needle other than the needle connected to nitrogen was wholly removed, and the contents were reacted at 70° C. for 3 hours in a nitrogen atmosphere. The septum was opened to thereby terminate the reaction. The reaction solution was introduced into a dialysis tube having an MWCO of 10,000 Da and dialyzed for 3 days while repeatedly replacing the water in a large amount, thereby removing the surfactant and unreacted monomers. This solution of electrolyte nanoparticles was diluted with pure water so as to result in a nanoparticle concentration of 10 mg/mL, and all anions were removed therefrom with a strong anion-exchange resin. Thereafter, the solution having a temperature of 30° C., 45° C., 60° C., or 75° C. was subjected to pH titration with an aqueous hydrochloric acid solution while conducting nitrogen bubbling. The results are shown in FIG. 17. In FIG. 17, the results of the titration of the solution at 30° C. are shown by the plot of (-○-), the results of the titration of the solution at 45° C. are shown by the plot of (-●-), the results of the titration of the solution at 60° C. are shown by the plot of (-□-), and the results of the titration of the solution at 75° C. are shown by the plot of (-■-). Incidentally, the abscissa in FIG. 17 indicates the molar amount of HCl used for titration per g of the nanoparticles. It can be seen from FIG. 17 that the apparent pKa declines as the temperature rises. It can also be seen that at the temperatures of 60° C. and higher, the apparent point of neutralization appears in two stages, and that at 75° C., the apparent amine amount has reduced to a half or less.

Example 5

[Synthesis and Evaluation of Basic Temperature-Responsive Nanoparticulate Electrolyte Containing Amine Group (Nanoparticles Obtained by Copolymerizing 65 mol % N-isoprorylacrylamide, 30 mol % DMAPM, and 5 mol % N,N'-methylenebisacrylamide as Crosslinking Agent)]

Figure 18:
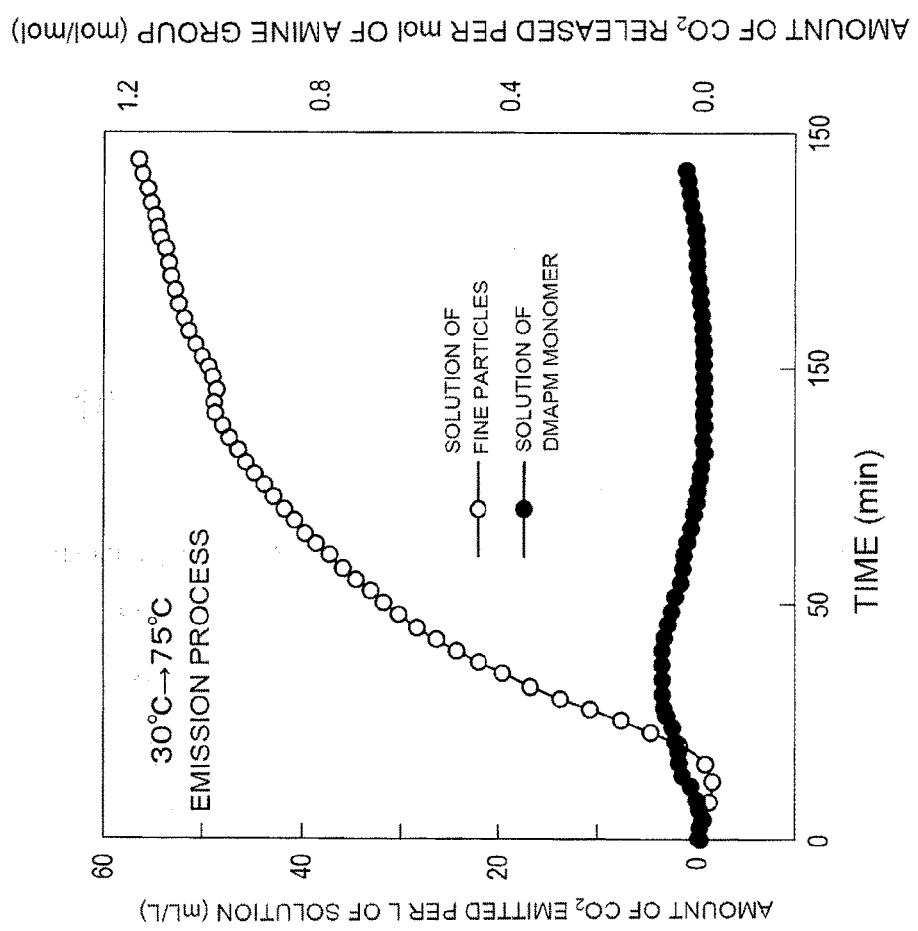
FIG. 18 is graphs which show the amount of temperature-dependent carbon dioxide emission in one example in which the invention has been applied to recovery of carbon dioxide.
Figure 19:
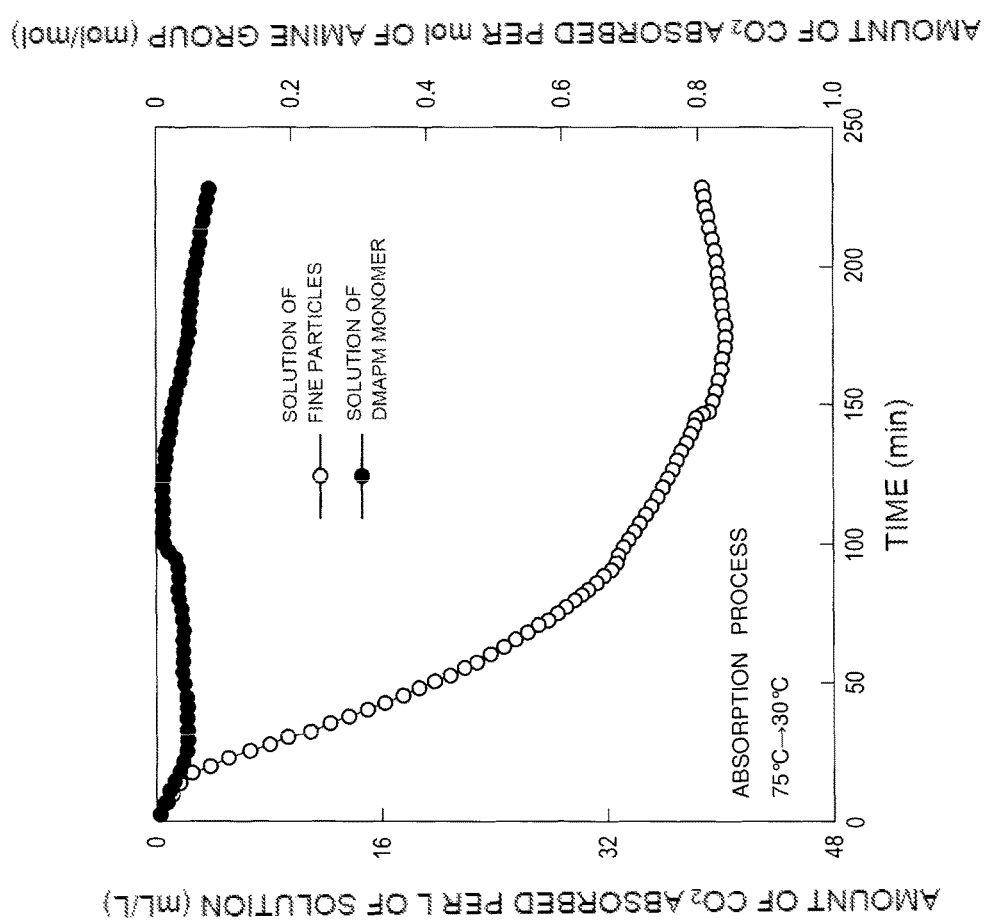
FIG. 19 is graphs which show the amount of temperature-dependent carbon dioxide absorption in one example in which the invention has been applied to recovery of carbon dioxide.
Figure 20:
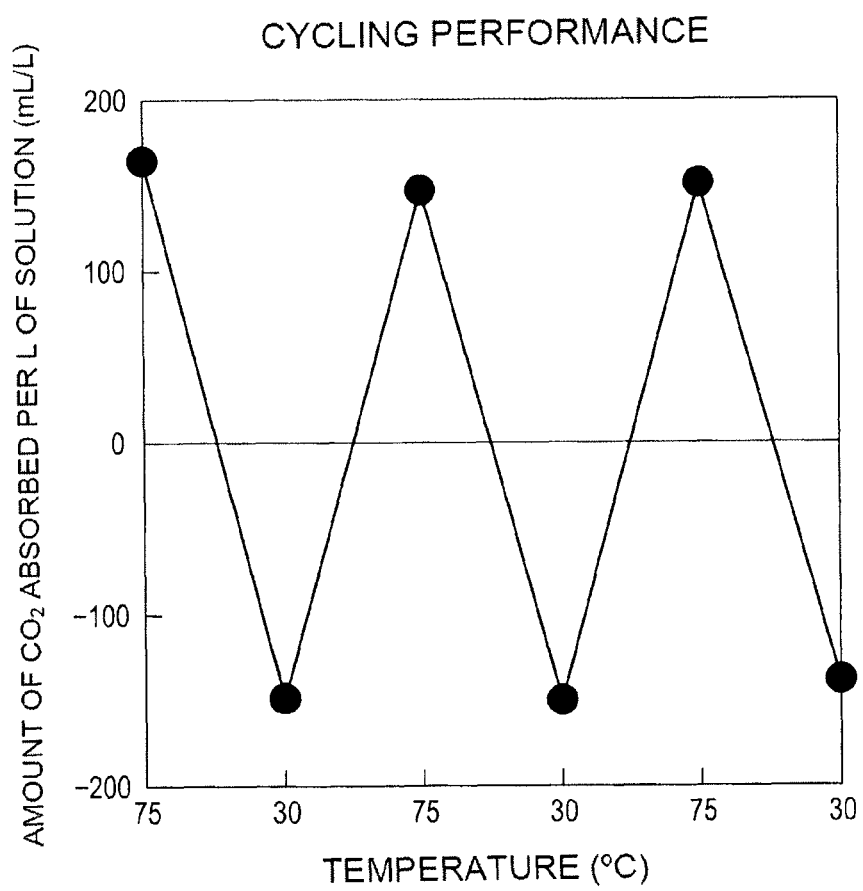
FIG. 20 is a graph which shows the amounts of temperature-dependent carbon dioxide absorption and emission and cycling performance in one example in which the invention has been applied to recovery of carbon dioxide.

In 30 mL of pure water were dissolved N-isoprorylacrylamide, DMAPM, and N,N'-methylenebisacrylamide in amounts of 65 mol %, 30 mol %, and 5 mol % respectively (monomer phase concentration, 312 mM). Therein was dissolved 21.9 mg of cetyltrimethylammonium bromide. This solution was introduced into a 100-mL eggplant type flask, which was then tightly sealed with a septum. The contents were stirred with a magnetic stirrer while being heated at 70° C. on an oil bath, until the contents became even. After the contents had become even, two needles were stabbed into the septum to dispose the tip of one needle under the liquid surface and the tip of the other needle over the liquid surface, and nitrogen was externally introduced through the needle under the liquid surface and gently bubbled into the liquid to conduct degassing for 30 minutes. A solution prepared by dissolving 21 mg of 2,2'-azobis(propane-2-carbamidine)dihydrochloride in 0.3 mL of ultra-pure water was added to that solution through a needle. The needle other than the needle connected to nitrogen was wholly removed, and the contents were reacted at 70° C. for 3 hours in a nitrogen atmosphere. The septum was opened to thereby terminate the reaction. The reaction solution was introduced into a dialysis tube having an MWCO of 10,000 Da and dialyzed for 3 days while repeatedly replacing the water in a large amount, thereby removing the surfactant and unreacted monomers. This solution of electrolyte nanoparticles was diluted with pure water so as to result in a nanoparticle concentration of 1 mg/mL, and all anions were removed therefrom with a strong anion-exchange resin. Thereafter, 500 mL of the solution was introduced into a gas washing bottle, and 10% carbon dioxide (90% nitrogen) gas was bubbled thereinto. The solution was saturated with carbon dioxide at 30° C. overnight, and the amount of carbon dioxide which was emitted when the solution was heated to 75° C. was determined with a gas chromatograph. The results thereof are shown by the plot of (-○-) in FIG. 18. The amount of carbon dioxide absorbed when the temperature was subsequently lowered from 75° C. to 30° C. was determined with a gas chromatograph, and the results thereof are shown by the plot of (-○-) in FIG. 19. Similar experiments were conducted using an aqueous solution of DMAPM monomer, which is a low-molecular weight compound (the amine concentration was the same as in the nanoparticles), and the results thereof are shown by the plots of (-●-) in FIG. 18 and FIG. 19. Incidentally, the graphs in FIG. 18 and FIG. 19 are plots from which the amounts of carbon dioxide which was emitted/absorbed when similar experiments were conducted using pure water have been subtracted. It was understood from FIG. 18 and FIG. 19 that DMAPM monomer, which is a low-molecular weight compound, emits or absorbs little carbon dioxide, whereas substantially one molecule of carbon dioxide is absorbed in and released from the temperature-responsive nanoparticles per molecule of the amine. The solution was subjected to the carbon dioxide emission/absorption cycle three times, and the emission amounts and absorption amounts in the cycling (per L of the same solution) are shown in FIG. 20.

Example 6

[Synthesis, Formation into Film, and Evaluation of Acidic Temperature-Responsive Electrolyte Containing Carboxylic Acid (Aqueous Solution of Nanoparticles Obtained by Copolymerizing 68 mol % N-isoprorylacrylamide, 10 mol % Acrylic Acid, 20 mol % N-t-butylacrylamide, Which is Highly Hydrophobic, and 2 mol % N,N'-methylenebisacrylamide as Crosslinking Agent)]

A solution of temperature-responsive electrolyte nanoparticles was prepared in the same manner as in Example 1, dried, and then dissolved in methanol, and this solution was cast on a glass semipermeable membrane. Another semipermeable membrane was superposed thereon to sandwich the cast methanol solution between the semipermeable membranes, and this methanol solution was allowed to dry naturally. Thus, a temperature-responsive electrolyte film was formed between the two semipermeable membranes. The film produced was set in a membrane permeation experiment device such as that shown in FIG. 6. Aqueous NaCl solutions differing in temperature were brought into contact with the film respectively from both sides thereof, and these aqueous solutions on both sides of the film were examined for pH and ion concentration. As a result, it was ascertained that the low-temperature-side aqueous solution had a reduced pH and an increased hydrogen ion concentration, while the high-temperature-side aqueous solution had an increased pH and a reduced hydroxyl ion concentration.

Example 7

[Synthesis, Formation into Film, and Evaluation of Basic Temperature-Responsive Nanoparticulate Electrolyte Containing Amine (Polymer Obtained by Copolymerizing 93 mol % N-isoprorylacrylamide (NIPAm), 5 mol % Amine-Containing Monomer, and 2 mol % N,N'-methylenebisacrylamide as Crosslinking Agent)]

In 30 mL of ultrapure water were dissolved 985 mg of N-isoprorylacrylamide (NIPAm), an acrylamide monomer having any of various amines as a side chain (DMAPM, aminopropylacrylamide (APM), or 1-H-imidazole-4-N-acryloylethanamine), the amount of the acrylamide monomer being 5/93 mole equivalent to the N-isoprorylacrylamide, 29 mg of N,N'-methylenebisacrylamide (2/93 mole equivalent to the N-isoprorylacrylamide), and 21.9 mg of cetyltrimethylammonium bromide. This solution was introduced into a 100-mL eggplant type flask, which was then tightly sealed with a septum. The contents were stirred with a magnetic stirrer while being heated at 70° C. on an oil bath, until the contents became even. After the contents had become even, two needles were stabbed into the septum to dispose the tip of one needle under the liquid surface and the tip of the other needle over the liquid surface, and nitrogen was externally introduced through the needle under the liquid surface and gently bubbled into the liquid to conduct degassing for 30 minutes. A solution prepared by dissolving 21 mg of 2,2'-azobis(propane-2-carbamidine)dihydrochloride in 0.3 mL of ultrapure water was added to that solution through a needle. The needle other than the needle connected to nitrogen was wholly removed, and the contents were reacted at 70° C. for 3 hours in a nitrogen atmosphere. The septum was opened to thereby terminate the reaction. The reaction solution was introduced into a dialysis tube having an MWCO of 10,000 Da and dialyzed for 3 days while repeatedly replacing the water in a large amount, thereby removing the surfactant and unreacted monomers. All anions in the aqueous solution were removed with a strong anion-exchange resin, and the aqueous solution was thereafter dried to obtain a white powder. The white powder was dissolved in methanol. This solution was cast into a U-shaped glass tube and allowed to dry naturally. Thus, a solid temperature-responsive electrolyte film was formed in the glass tube. A given amount of water was added to the film, and 20° C. 10% carbon dioxide (90% nitrogen) saturated with water vapor was passed through the glass tube. The temperature of the glass tube was changed between 30° C. and 75° C., and the amount of carbon dioxide absorbed or emitted during this operation was determined with a gas chromatograph.

Incidentally, to adjust the temperature of the glass tube to 30° C. is to cause the electrolyte film to absorb carbon dioxide, while to adjust the temperature thereof to 75° C. is to cause the electrolyte film to emit the absorbed carbon dioxide.

Example 8

[Synthesis and Evaluation of Basic Temperature-Responsive Polymer Electrolyte Containing Amine Group (Linear Polymer Obtained by Copolymerizing 95 mol % N-isoprorylacrylamide and 5 mol % DMAPM)]

A solution of a temperature-responsive polymer electrolyte was synthesized in the same manner as in Example 3 and dried to obtain a white powder. The white powder was dissolved in methanol. This solution was cast into a U-shaped glass tube and allowed to dry naturally. Thus, a solid temperature-responsive electrolyte film was formed in the glass tube. A given amount of water was added to the film, and 20° C. 10% carbon dioxide (90% nitrogen) saturated with water vapor was passed through the glass tube. The temperature of the glass tube was changed between 30° C. and 75° C., and the amount of carbon dioxide absorbed or emitted during this operation was determined with a gas chromatograph.

Films produced in Examples 7 and 8 (the film constituted of nanoparticles containing 5% by mole DMAMP; the film constituted of nanoparticles containing 5% by mole AMP; and the film constituted of a linear polymer containing 5% by mole DMAMP) and films as Reference or Comparative Examples, i.e., a film constituted of nanoparticles of an NIPAm homopolymer, a film constituted of a linear polymer containing 98% by mole DMAMP, and a film to which no water had been added, were examined for carbon dioxide absorption and emission amounts. The results thereof are shown in FIG. 21.

Figure 21:
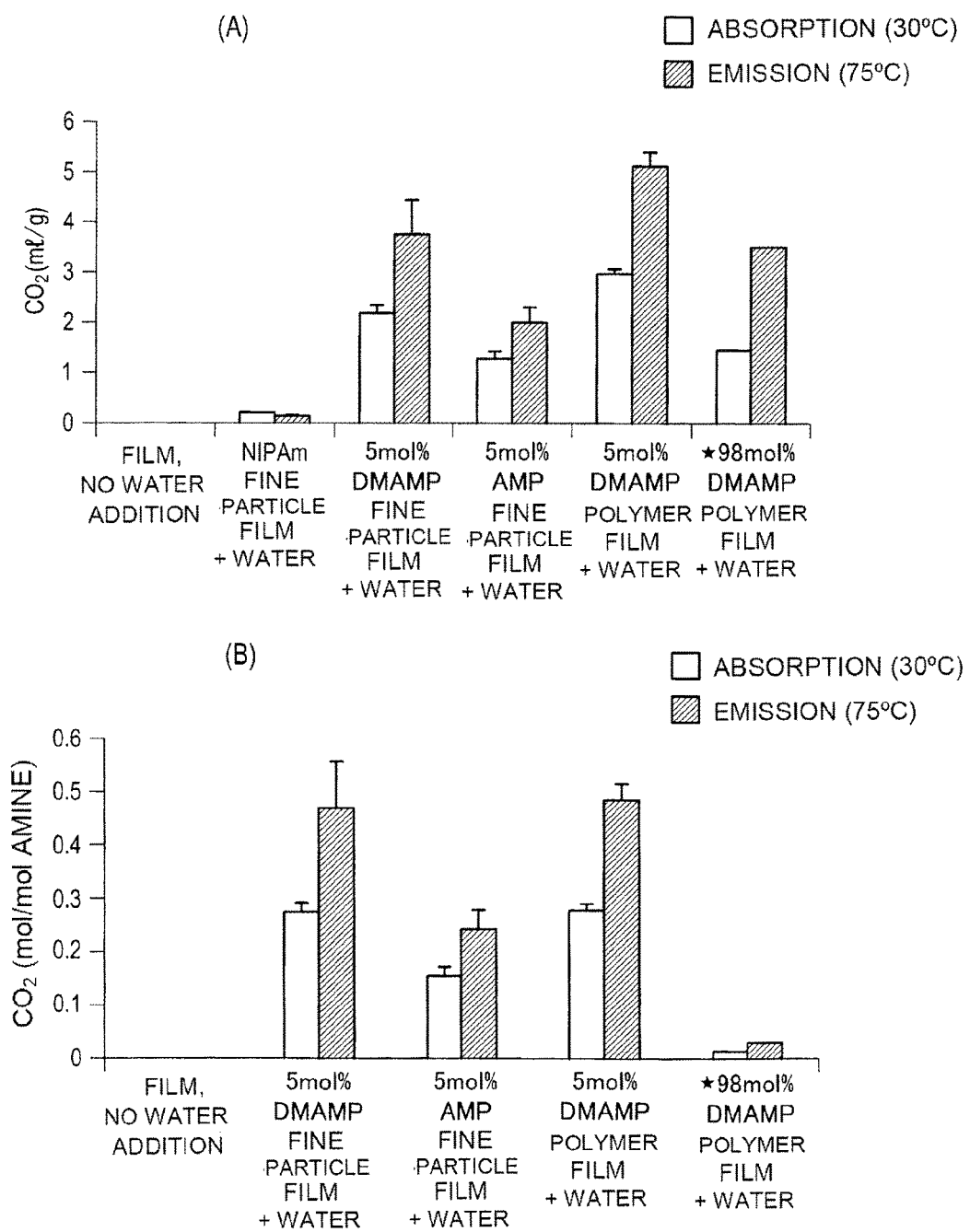
FIG. 21 is graphs which show the amounts of carbon dioxide absorption and emission in an example in which temperature-responsive solid electrolytes have been applied to recovery of carbon dioxide.

In FIG. 21, (A) shows the volume amount (mL) of carbon dioxide absorbed or emitted per g of each film, and (B) shows the molar amount (mol) of carbon dioxide absorbed or emitted per mole of the amine groups of each film.

In the case where the films having amine groups were used, sufficient absorption and emission of carbon dioxide was able to be ascertained.

However, in the case of the film having no amine group (the film constituted of NIPAm homopolymer nanoparticles), only slight absorption and emission of carbon dioxide was able to be ascertained. In the case where the film to which no water had been added was used, absorption and emission of carbon dioxide was unable to be ascertained at all. In the case of the film constituted of a linear polymer containing 98% by mole DMAMP, sufficient absorption and emission of carbon dioxide was able to be ascertained but the molar amount of carbon dioxide absorbed or emitted per mole of the amino groups was not large.

While the invention has been described in detail and with reference to specific embodiments thereof, it will be apparent to one skilled in the art that various changes and modifications can be made therein without departing from the spirit and scope thereof.

This application is based on a U.S. provisional patent application filed on Aug. 19, 2011 (61/525,421) and a U.S. provisional patent application filed on May 14, 2012 (61/646,543), the entire contents thereof being incorporated herein by reference. Furthermore, all references cited herein are incorporated herein as a whole.

INDUSTRIAL APPLICABILITY

The system, device, and method for producing an ion concentration gradient according to the invention and the temperature-responsive electrolyte material according to the invention can be applied to batteries and the like, recovery of an acid gas, such as carbon dioxide, ion separation, improvements in the efficiency of fuel cells, and other applications including energy conversion.

DESCRIPTION OF THE REFERENCE NUMERALS

1 Vessel
2 Cold source
3 Heat source
4 Connecting member
5 Semipermeable membrane
6 Pump
7 Electrode
11 Temperature-responsive solid electrolyte
21 Cold source means
31 Heat source means

The invention claimed is:

1. A system for producing an ion concentration gradient, comprising a temperature-responsive electrolyte, a first source and a second source, wherein the first source and the second source give, to the temperature-responsive electrolyte, different temperatures that are respectively on both sides of the phase transition temperature of the temperature-responsive electrolyte.

2. The system according to claim 1, wherein the different temperatures that are respectively on both sides of the phase transition temperature are maintained.

3. The system according to claim 1, wherein the first source comprises a cold source and the second source comprises a heat source.

4. The system according to claim 1, wherein the temperature-responsive electrolyte has an ionizable functional group and undergoes a volume phase transition in response to temperature.

5. The system according to claim 1, wherein the temperature-responsive electrolyte is used in the state of an aqueous solution.

6. The system according to claim 5, wherein the temperature-responsive electrolyte is an aqueous solution of fine hydrogel particles having basic functional groups and undergoing a volume phase transition in response to temperature.

7. The system according to claim 6, which comprises a plurality of vessels containing the temperature-responsive electrolyte, wherein a first part of the plurality of vessels is the first source and a second part of the plurality of vessels is the second source.

8. The system according to claim 7, wherein the first part of the plurality of vessels and the second part of the plurality of vessels are connected to each other so that the temperature-responsive electrolyte and ions can move therebetween.

9. The system according to claim 7, wherein the inside of the vessels is partitioned into two sections with a semipermeable membrane which is permeable to ions but impermeable to the temperature-responsive electrolyte.

10. The system according to claim 9, wherein the temperature-responsive electrolyte is contained in only one of the two sections.

11. The system according to claim 1, wherein the temperature-responsive electrolyte is used in the state of a solid phase.

12. The system according to claim 11, wherein the temperature-responsive electrolyte is a thin film of a hydrogel having basic functional groups and undergoing a volume phase transition in response to temperature.

13. The system according to claim 12, which comprises a plurality of vessels containing an aqueous salt solution, wherein the plurality of vessels are connected to each other by the solid phase of the temperature-responsive electrolyte.

14. The system according to claim 1, wherein at least one of the first source and the second source is waste heat.

15. The system according to claim 1, which is for use in recovering an acid gas.

16. The system according to claim 15, wherein the temperature-responsive electrolyte has a basic group.

17. The system according to claim 15, wherein the recovery of the acid gas comprises causing the acid gas to be absorbed into a basic aqueous solution or into an aqueous solution of the temperature-responsive electrolyte, and causing the basic aqueous solution or the aqueous solution of the temperature-responsive electrolyte to release the absorbed acid gas.

18. The system according to claim 17, wherein the acid gas is absorbed into the aqueous solution by adjusting the aqueous solution to the phase transition temperature of the temperature-responsive electrolyte or lower.

19. The system according to claim 17, wherein the acid gas absorbed into the aqueous solution is released by adjusting the aqueous solution to the phase transition temperature of the temperature-responsive electrolyte or higher.

20. The system according to claim 9, wherein at least one of the first source and the second source is waste heat.

* * * * *